(12) United States Patent
Araumi et al.

(10) Patent No.: US 12,075,167 B2
(45) Date of Patent: *Aug. 27, 2024

(54) COMMUNICATION TERMINAL, DISPLAY METHOD, AND NON-TRANSITORY COMPUTER-READABLE MEDIUM FOR DISPLAYING IMAGES AND CONTROLLER

(71) Applicant: Ricoh Company, Ltd., Tokyo (JP)

(72) Inventors: Yuichi Araumi, Tokyo (JP); Atsushi Itoh, Kanagawa (JP); Ryota Yamashina, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/455,712

(22) Filed: Nov. 19, 2021

(65) Prior Publication Data

US 2022/0078344 A1 Mar. 10, 2022

Related U.S. Application Data

(63) Continuation of application No. 16/514,238, filed on Jul. 17, 2019, now Pat. No. 11,212,439.

(30) Foreign Application Priority Data

Jul. 24, 2018 (JP) .................................. 2018-138860
Jan. 30, 2019 (JP) .................................. 2019-014869

(51) Int. Cl.
*H04N 23/698* (2023.01)
*H04N 5/272* (2006.01)
(Continued)

(52) U.S. Cl.
CPC ........... *H04N 23/698* (2023.01); *H04N 5/272* (2013.01); *H04N 5/45* (2013.01); *H04N 13/204* (2018.05); *H04N 2005/2726* (2013.01)

(58) Field of Classification Search
CPC .............. H04N 13/117; H04N 13/204; H04N 2005/2726; H04N 5/2224; H04N 5/23206;
(Continued)

(56) References Cited

U.S. PATENT DOCUMENTS 8,903,568 B1 12/2014 Wang et al.
10,200,616 B2 * 2/2019 Hada ...................... H04N 23/63
(Continued)

FOREIGN PATENT DOCUMENTS

CN 104605794 5/2015
JP 2005-175970 6/2005
(Continued)

OTHER PUBLICATIONS

Japanese Office Action for 2019-014869 mailed on Sep. 6, 2022.
Japanese Office Action for 2019-014869 mailed on Feb. 28, 2023.

*Primary Examiner* — Jessica M Prince
(74) *Attorney, Agent, or Firm* — IPUSA, PLLC

(57) ABSTRACT

A communication terminal is communicable with another communication terminal mounted on a mobile apparatus or with a communication device of the mobile apparatus via a network. The communication terminal transmits operation instruction information for controlling the mobile apparatus to the another communication terminal or the communication device. The communication terminal includes circuitry configured to: receive a first video transmitted by one of the another communication terminal and the communication device and a second video having a wide-angle of view captured by a wide-angle image capturing apparatus; display, on a display device, at least one of the first video and the second video that are received; and display, on the display device, a controller for controlling an operation of (Continued)

the mobile apparatus as being superimposed on the at least one of the first video and the second video.

19 Claims, 30 Drawing Sheets

(51) Int. Cl.
  *H04N 5/45* (2011.01)
  *H04N 13/204* (2018.01)
(58) Field of Classification Search
  CPC ........... H04N 5/23238; H04N 5/23293; H04N 5/272; H04N 5/45
  See application file for complete search history.

(56) References Cited

U.S. PATENT DOCUMENTS

| | | | |
|---|---|---|---|
| 10,666,863 B2 | 5/2020 | Wozniak et al. | |
| 2010/0306829 A1 | 12/2010 | Nishio | |
| 2011/0023102 A1 | 1/2011 | Ikeda | |
| 2012/0197464 A1* | 8/2012 | Wang | G05D 1/0274 701/28 |
| 2013/0106991 A1 | 5/2013 | Misawa et al. | |
| 2014/0192212 A1* | 7/2014 | He | G02B 13/06 399/296 |
| 2014/0270692 A1* | 9/2014 | Suzuki | H04N 23/698 386/230 |
| 2016/0191980 A1* | 6/2016 | Yu | H04N 21/818 725/40 |
| 2017/0068380 A1* | 3/2017 | Hong | G06F 3/0482 |
| 2017/0108857 A1 | 4/2017 | Line | |
| 2017/0237938 A1* | 8/2017 | Kokubo | H04N 7/147 348/14.04 |
| 2018/0035049 A1* | 2/2018 | Hussain | H04R 3/005 |
| 2018/0146216 A1 | 5/2018 | Chang et al. | |
| 2018/0213362 A1* | 7/2018 | Nishikawa | H04N 7/141 |
| 2018/0337985 A1* | 11/2018 | Nishikawa | H04L 67/1059 |
| 2018/0338116 A1* | 11/2018 | Nishikawa | G05D 1/0297 |
| 2020/0177823 A1* | 6/2020 | Zhu | G06T 11/60 |

FOREIGN PATENT DOCUMENTS

| | | |
|---|---|---|
| JP | 2008-170930 | 7/2008 |
| JP | 2009-015730 | 1/2009 |
| JP | 2010-231359 | 10/2010 |
| JP | 2010-277185 | 12/2010 |
| JP | 2011-028577 | 2/2011 |
| JP | 2013-097094 | 5/2013 |
| JP | 2013-112030 | 6/2013 |
| JP | 2016-123127 | 7/2016 |
| JP | 2016-225875 | 12/2016 |
| JP | 2017-123627 | 7/2017 |
| WO | 2012/103525 | 8/2012 |
| WO | 2017/179136 | 10/2017 |

* cited by examiner

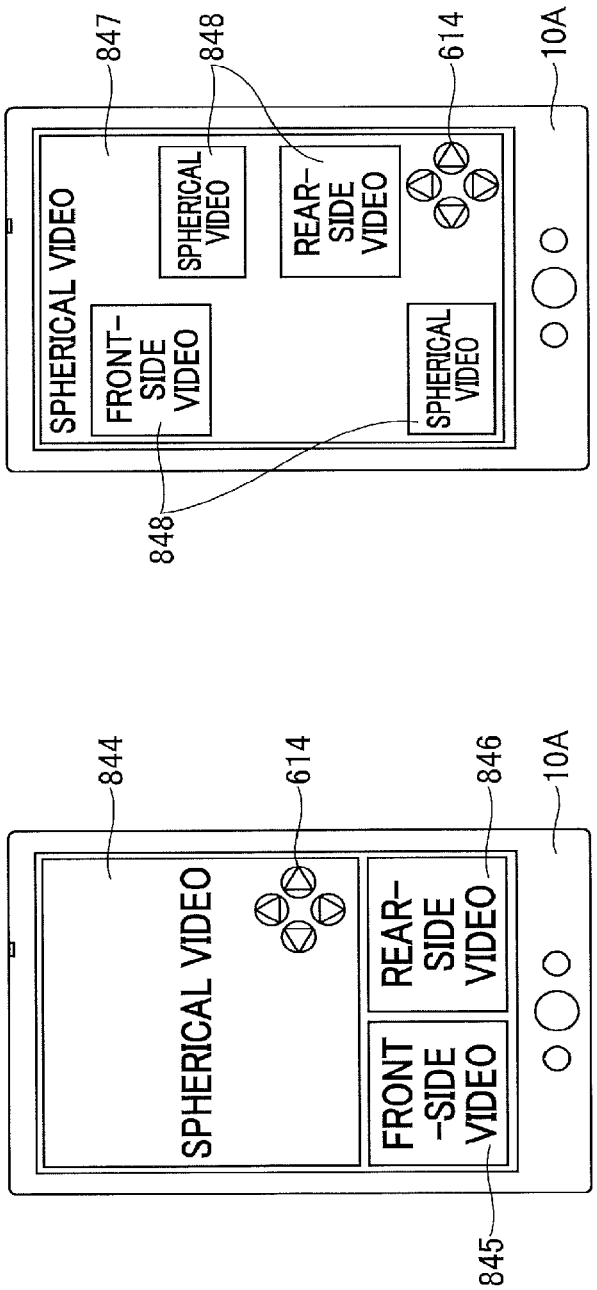

HEMISPHERICAL IMAGE (FRONT)

HEMISPHERICAL IMAGE (BACK)

CAPTURED IMAGE (EQUIRECTANGULAR PROJECTION IMAGE EC)

EQUIRECTANGULAR PROJECTION IMAGE EC

SPHERICAL IMAGE CE

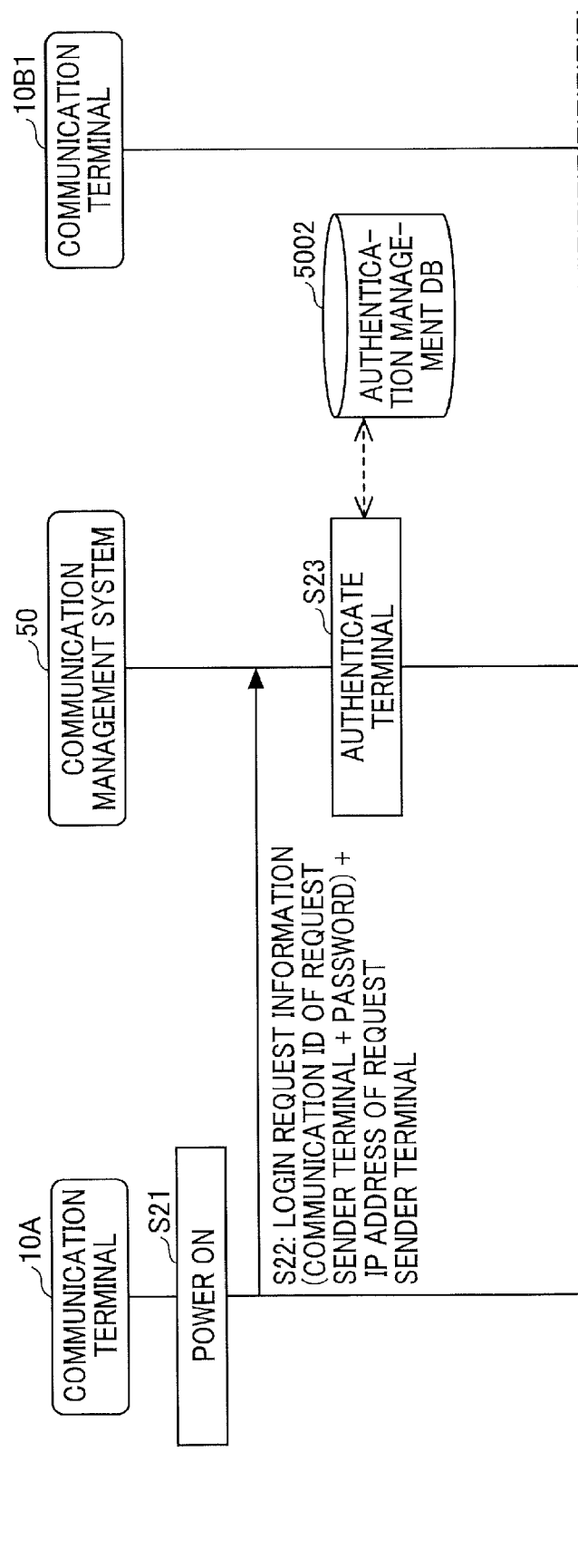

COMMUNICATION TERMINAL, DISPLAY METHOD, AND NON-TRANSITORY COMPUTER-READABLE MEDIUM FOR DISPLAYING IMAGES AND CONTROLLER

CROSS-REFERENCE TO RELATED APPLICATIONS

The present application is a continuation application filed under 35 U.S.C. 111(a) claiming the benefit under 35 U.S.C. 120 of U.S. patent application Ser. No. 16/514,238 filed on Jul. 17, 2019, which is based on and claims the benefit of priority to Japanese Priority Application No. 2018-138860, filed on Jul. 24, 2018 and Japanese Priority Application No. 2019-014869, filed on Jan. 30, 2019, the entire disclosures of which are hereby incorporated herein by reference.

BACKGROUND

Technical Field

Embodiments of the present disclosure relate to a communication terminal, a display method, and a non-transitory computer-readable medium.

Description of the Related Art

Communication systems are now in widespread use, according to which communication terminals provided in different remote sites communicate via a communication network such as the Internet or a local area network (LAN) to exchange video and audio data with each other. Such communication systems allow users in the remote sites communicate. For example, users can hold a videoconference.

Further, robots to which the communication system as described above is applied are known. Such robots are called "telepresence robots". In other words, the telepresence robot is a robot in which a "videoconference" and a "remote control technology" are combined. The telepresence robot uses the combination of remote control technologies from a remote place and robot technologies, allowing an operator to operate a mobile apparatus for moving a robot from a remote place and behave as if the operator is present in a certain place.

Also, a technology for mounting a plurality of cameras on a robot is known.

SUMMARY

Embodiments of the present disclosure describes a communication terminal, communicable with another communication terminal mounted on a mobile apparatus or with a communication device of the mobile apparatus via a network. The communication terminal transmits operation instruction information for controlling the mobile apparatus to the another communication terminal or the communication device. The communication terminal includes circuitry configured to: receive a first video transmitted by one of the another communication terminal and the communication device and a second video having a wide-angle of view captured by a wide-angle image capturing apparatus, the wide-angle image capturing apparatus being connected to one of the mobile apparatus and the another communication terminal or being configured as a single unit with one of the mobile apparatus and the another communication terminal; display, on a display device, at least one of the first video and the second video that are received; and display, on the display device, a controller for controlling an operation of the mobile apparatus as being superimposed on the at least one of the first video and the second video.

BRIEF DESCRIPTION OF THE SEVERAL VIEWS OF THE DRAWINGS

A more complete appreciation of the embodiments and many of the attendant advantages and features thereof can be readily obtained and understood from the following detailed description with reference to the accompanying drawings, wherein:

FIG. 2A to FIG. 2D are illustration for describing display examples of a front-side video and/or a rear-side video captured by a planar image capturing apparatus and a spherical video captured by a wide-angle image capturing apparatus, according to an embodiment of the present disclosure;

FIG. 15A and FIG. 15B are a sequence diagram illustrating an example of processes in a communication preparation stage, performed by the communication system, according to an embodiment of the present disclosure;

Figure 1A:
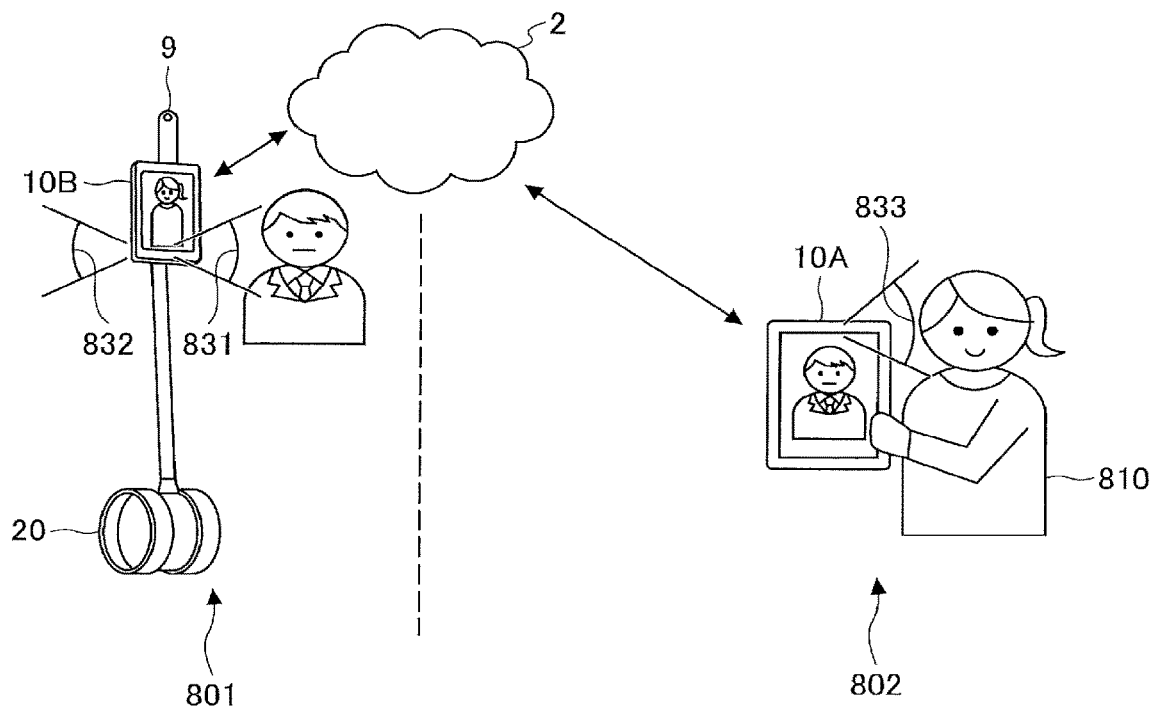
FIG. 1A and FIG. 1B are schematic diagrams for describing an overview of a communication system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of a communication terminal and a method of displaying video performed by the communication terminal according to an example embodiment of the present disclosure, with reference to the drawings.

<Overview of Operation by Communication System and Communication Terminal>

Figure 1B:
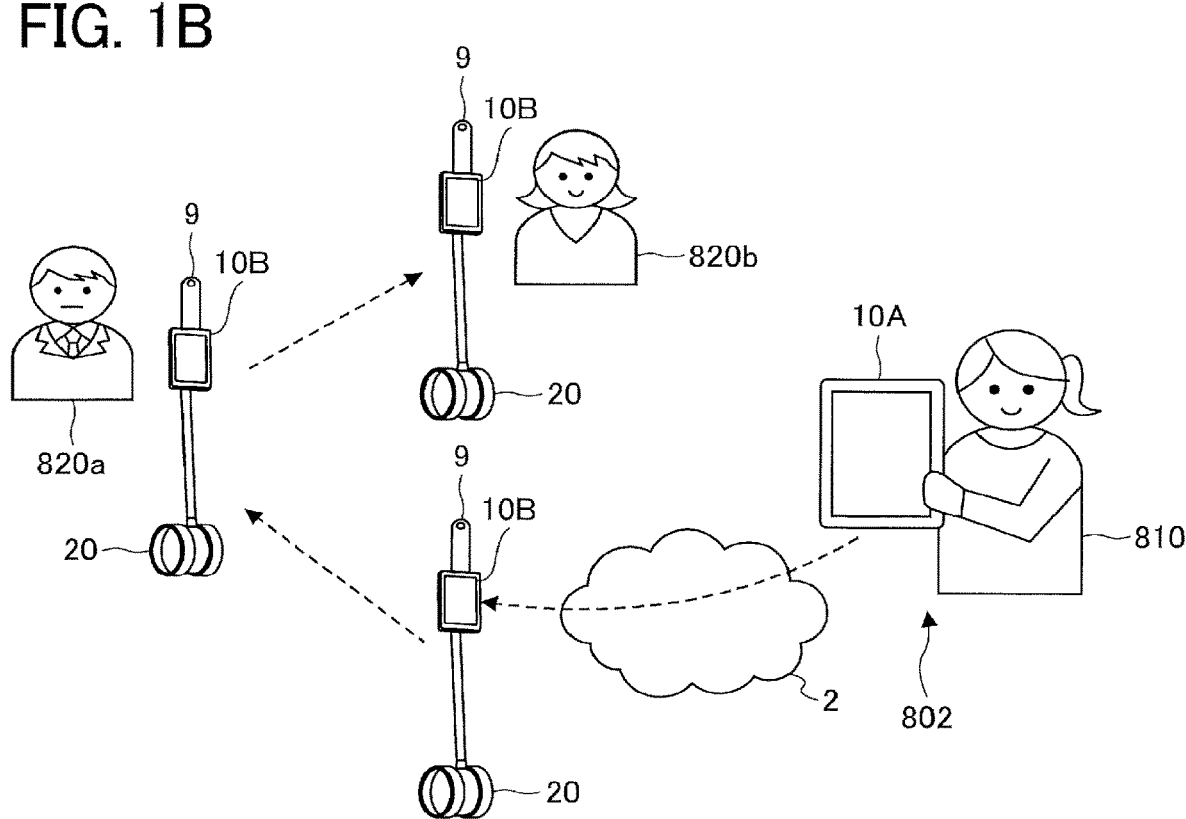

Referring to FIG. 1A and FIG. 1B, a description is given of an overview of a communication system 1. FIG. 1A is a schematic diagram illustrating an example of a configuration of the communication system 1 that uses a telepresence robot. The telepresence robot is provided in an office 801, and an operator 810 is present at home 802. The telepresence robot includes a communication terminal 10B and a wide-angle image capturing apparatus 9, which are mounted on a mobile apparatus 20. The operator 810 has a communication terminal 10A.

The wide-angle image capturing apparatus 9 transmits a spherical video (an example of a second video) described later to the communication terminal 10B. Each of the communication terminal 10A and the communication terminal 10B include a planar image capturing device and a microphone, and exchange video and audio with each other. More specifically, the communication terminal 10B transmits the spherical video and a front-side video 831 (and/or a rear-side video 832, an example of a first video) to the communication terminal 10A, and the communication terminal 10A transmits the front-side video 831 to the communication terminal 10B.

Further, in the communication terminal 10A, software (hereinafter referred to as an "application") that receives an operation relating to movement or the like of the mobile apparatus 20 is operating. The operator 810 inputs an operation instruction while confirming the video transmitted by the communication terminal 10B. The operation instruction input by the operator 810 is transmitted from the communication terminal 10A to the communication terminal 10B.

The communication terminal 10B and the mobile apparatus 20 can communicate by short-range communication such as Bluetooth (registered trademark), and the communication terminal 10B controls the mobile apparatus 20 based on the operation instruction transmitted from the communication terminal 10A. Accordingly, the operator 810 can cause the mobile apparatus 20 to move from a remote place (home).

By causing the mobile apparatus 20 to move as described above, the operator 810 can talk with a desired communication partner 820 as illustrated in FIG. 1B. FIG. 1B illustrates an example in which the operator 810 causes the mobile apparatus 20 to move to a place where Mr. A 820a is present and talks with Mr. A, and then causes the mobile apparatus 20 move to a place where Ms. B 820b is present and talks with Ms. B.

In addition to meeting persons, the operator 810 can perform any other activities without visiting an actual place, such as checking products in remote stores, inspecting a factory, and participating in exhibitions, etc.

Since the planar image capturing apparatus that is built in the communication terminal 10B captures only a front-side image (video) and a rear-side image (video), it is difficult for the operator 810 to recognize the situation around the mobile apparatus 20 (e.g., an area around the bottom part of the mobile apparatus 20 or the area to left or right to the mobile apparatus 20). To address this issue, in the present embodiment, the wide-angle image capturing apparatus 9 configured to capture surroundings in 360-degree directions is mounted on the communication terminal 10B. In one example, the wide-angle image capturing apparatus 9 is mounted on the communication terminal 10B. In another example, the wide-angle image capturing apparatus 9 is mounted on the mobile apparatus 20. Since the wide-angle image capturing apparatus 9 can capture an image (video) of a wide-angle area, the wide-angle image capturing apparatus 9 is disposed on the upper side where the wide-angle image capturing apparatus 9 is not likely to be blocked by surroundings. In the example of FIG. 1A and FIG. 1B, the wide-angle image capturing apparatus 9 is disposed on the upper side of the communication terminal 10B. In another example, the wide-angle image capturing apparatus 9 can be disposed on the left side or the right side of the communication terminal 10B. In still another example, the wide-angle image capturing apparatus 9 can be disposed in the pole portion of the mobile apparatus 20.

Referring to FIG. 2A to 2D, a description is given of an overview of how the communication terminal 10A according to the present embodiment displays a video captured by the planar image capturing apparatus and a video captured by the wide-angle image capturing apparatus 9 configured to capture omnidirectional 360-degree video. FIG. 2A to FIG. 2D are illustration for describing display examples of a front-side video and/or a rear-side video captured by the planar image capturing apparatus and a spherical video captured by the wide-angle image capturing apparatus 9. In the present embodiment, a description is given of three patterns as examples of layout of a front-side video, a rear-side video, and a spherical video.

Figure 2A:
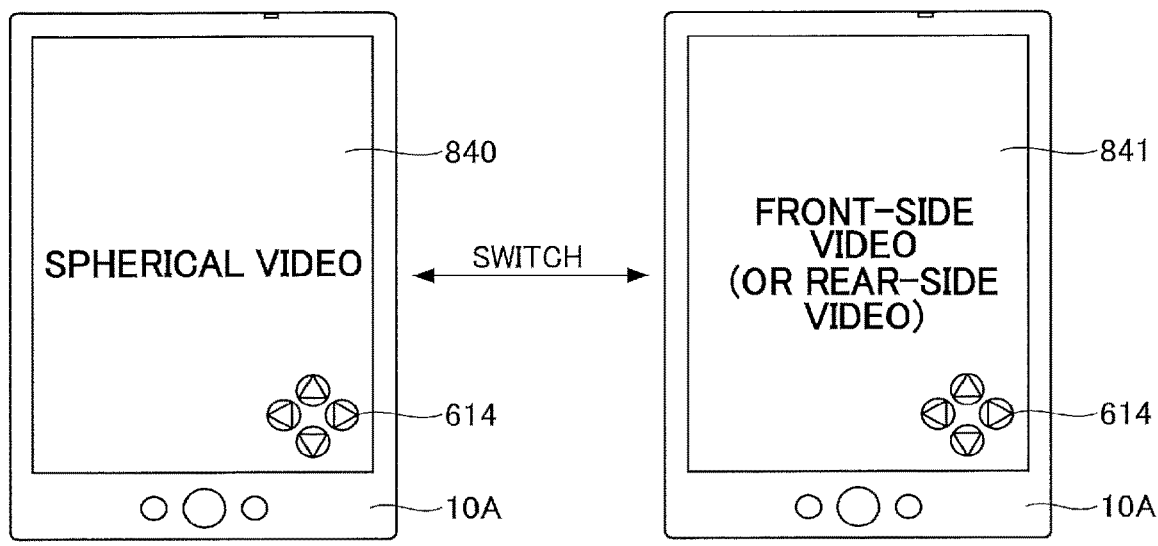

FIG. 2A illustrates a layout example of Pattern 1. Pattern 1 is a layout example in which a spherical video 840 and a front-side video (a rear-side video) 841 are switched and displayed. In the left view of FIG. 2A, the communication terminal 10A displays the spherical video 840 in a full screen size. By contrast, in the right view of FIG. 2A, the front-side video (or the rear-side video) 841 is displayed in a full screen size. When a certain image is displayed in a full screen size, it does not mean that any elements other than the certain image should not be displayed. For example, an application software key or a screen of another application can be included. The operator 810 can switch between the front-side video (or the rear-side video) and the spherical video. Accordingly, the operator can view both the front-side video (or the rear-side video) and the spherical video on a large screen.

Figure 2B:
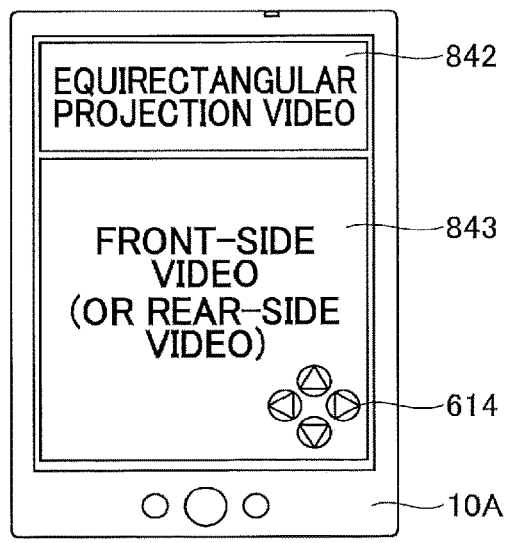

FIG. 2B illustrates a layout example of Pattern 2. Pattern 2 is a layout example in which the spherical video and the front-side video (rear-side video) are displayed on the same screen. In FIG. 2B, an equirectangular projection video 842, which is obtained by converting the spherical video to planar video by equirectangular projection, is displayed in an upper smaller area, and the front-side video (or the rear-side video) 843 is displayed in a lower larger area. This allows the operator 810 to recognize the front or the rear situation by viewing the front-side video (or the rear-side video) 843 while recognizing the entire situation by viewing the equirectangular projection video 842.

FIG. 2C and FIG. 2D illustrate layout examples of Pattern 3. Pattern 3 is a layout example in which one of the spherical video and the front-side video (rear-side video) is displayed as a main video, and a main screen and a plurality of sub screens are combined. In FIG. 2C, the spherical video is displayed on a main screen 844, and the front-side video and the rear-side video are displayed respectively on a sub screen 845 and a sub screen 846, which are arranged below the main screen. In FIG. 2D, the spherical video is displayed on a main screen 847, and a plurality of sub screens 848 are arranged over the main screen. On the sub screens 848, the front-side video, the rear-side video, and duplicates of a partial angle of view of the spherical video are displayed in a desired manner.

In FIG. 2A to FIG. 2D, a mobile apparatus operation button 614 (an example of a controller) is displayed on at least one of the spherical video and the front-side video (or the rear-side video). By using the mobile apparatus operation button 614, the operator 810 can cause the mobile apparatus 20 to move while viewing the spherical video or the front-side video (or the rear-side video).

As described above, in the communication system according to the present embodiment, the communication terminal 10A used by the operator 810 appropriately arranges and displays the spherical video and the front-side video (rear-side video). This allows the operator 810 to check an overview situation around the mobile apparatus 20 or check the front-side video or the rear-side video having high resolution.

<Terms Used in This Disclosure>

The "operator 810" refers to a person who operates the mobile apparatus 20. Although the operator 810 is also a user who uses the communication terminal 10A, such user is referred to as an "operator" in the present embodiment.

The communication partner 820 is a person in the office or the like. In another example, the communication partner can be an animal such as a dog or a cat. In still another example, the mobile apparatus 20 can be used for any suitable purpose other than allowing the operator 810 to talk with the communication partner. For example, in a case where the mobile apparatus 20 patrols an office or the like, the communication terminal 10B just transmits video and audio to the communication terminal 10A. In this case, the operator 810 has no conversation.

A place where the mobile apparatus 20 moves can be any place where the mobile apparatus 20 can move. Further, the mobile apparatus 20 is not limited to an apparatus that moves with power such as a motor. For example, a person can assist the movement of the mobile apparatus 20.

The "first video" refers to a video having a normal angle of view. The "second video" refers to a video having an angle of view that is wider than the normal angle of view of the first video. The normal angle of view is an angle of view in which distortion is acceptable even when a perspective projection lens is used for imaging. In other words, the first image can be said as a video imaged by a perspective projection lens. The "video having a wide angle of view" refers to an image captured by a wide-angle lens such as a fisheye lens, for example. Examples of projection method include stereographic projection, equidistant projection, isostatic projection and orthographic projection. A spherical video obtained by capturing 360-degree surroundings is one example of the video having a wide angel of view. In another example, the video having a wide-angle of view can be a hemispherical video or a video having an angle of view of 180 to 360 degrees in the horizontal direction.

The term "large", which is used in the description such as the first video or the second video is displayed large, refers to that a display area of the first video or the second video is large, that is, the size of an area that occupies a screen. The number of pixels per unit length of the first video can be larger than that of the second video. In another example, the number of pixels per unit length of the second video can be larger than that of the first video.

In the present embodiment, the term "video" is used on the assumption that it is a moving image. By contrast, the term "image" is used on the assumption that it is a single still image. However, since a video includes a plurality of images, and the term "video" and the term "image" are used in the present embodiment to describe any one of a moving image and a still image.

The description "perform(ing) control so that at least one of the first video and the second video is displayed" refers to concurrently displaying the first video and the second video, or displaying any one of the first video and the second video. Preferably, this description refers to that a user can select whether the first video and the second video are to be displayed concurrently or any one of the first video and the second video is to be displayed.

The "controller for controlling a mobile apparatus" refers to, for example, a user interface, a software key, a display component or the like that can transmit some kinds of control signals to the mobile apparatus. A control signal for controlling the mobile apparatus to move is one example of the control signals. In another example, the control signals include a control signal for controlling on and off of the power, a control signal for controlling the stop and resume of imaging, a control signal for controlling illumination of an indicator lamp, and a control signal for controlling reproduction of a moving image.

Example of System Configuration

Figure 3:
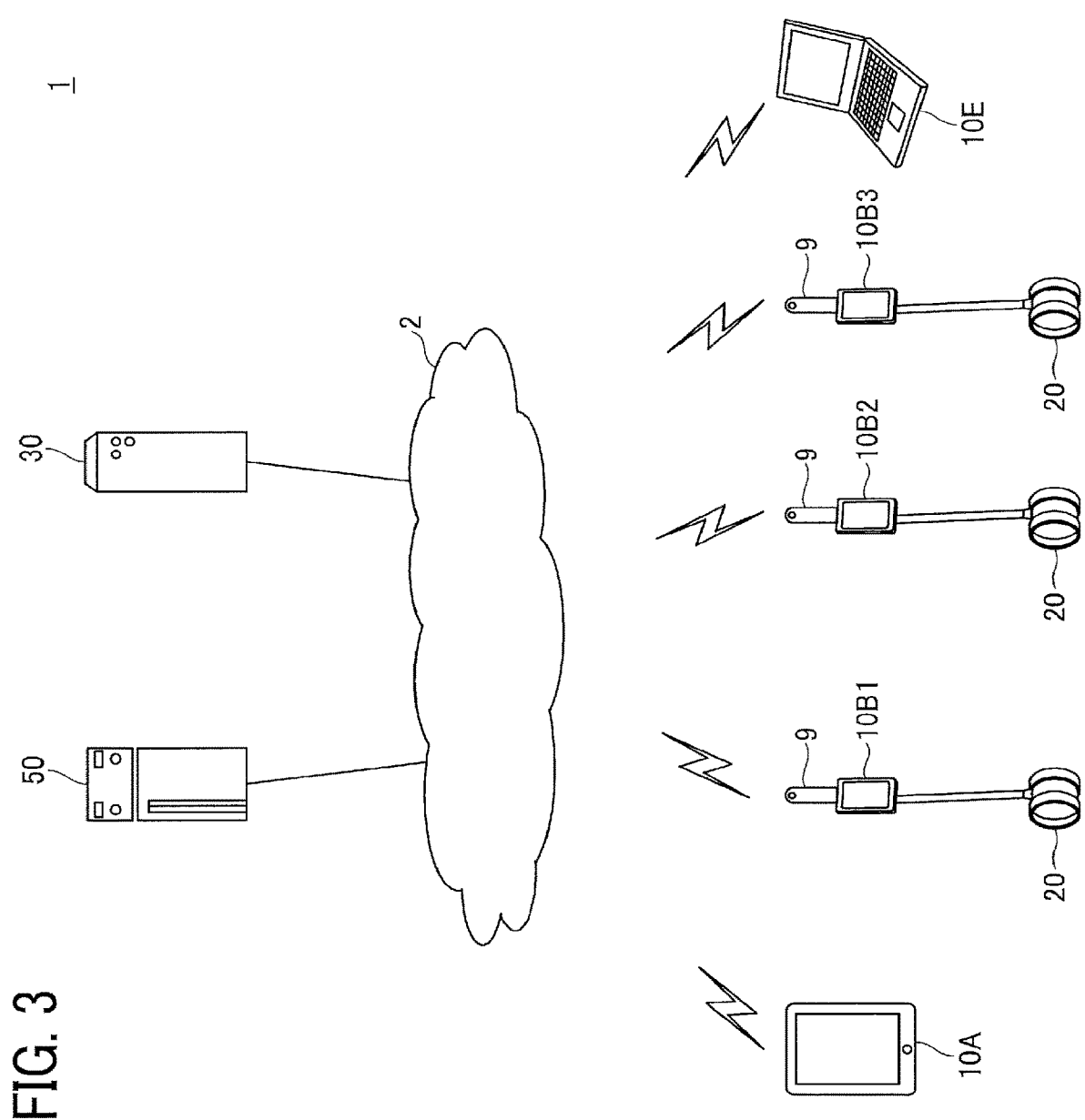
FIG. 3 is a diagram illustrating an example of a configuration of the communication system, according to an embodiment of the present disclosure.

FIG. 3 is a diagram illustrating an example of a configuration of the communication system 1, according to an embodiment. The communication system 1 includes a plurality of communication terminals (a communication terminal 10A, a communication terminal 10B1, a communication terminal 10B2, a communication terminal 10B3, a communication terminal 10E), the mobile apparatus 20, a relay apparatus 30, a communication management system 50. In the following description, any arbitrary one or more of the plurality of communication terminals (the communication terminal 10A, the communication terminal 10B1, the communication terminal 10B2, the communication terminal 10B3, the communication terminal 10E) is referred to as a "communication terminal 10" or "communication terminals 10". In addition, any arbitrary one or more of the communication terminal 10B1, the communication terminal 10B2, and the communication terminal 10B3 is referred to as a "communication terminal 10B" or "communication terminals 10B". The number of the communication terminals 10 illustrated in FIG. 3 is one example.

The communication terminals 10, the relay apparatus 30, and the communication management system 50 are communicably connected to one another through a communication network 2. The communication network 2 includes, a local area network (LAN), the Internet, a mobile phone network, and/or a dedicated line, for example.

Examples of the communication terminal 10 include a general-purpose information processing apparatus such as a tablet terminal, a smartphone, and a personal computer (PC) and a dedicated videoconference apparatus. Any one of the communication terminals 10 transmits and receives image data, audio data or the like to and from one or more of the other communication terminals 10 to perform videoconference, for example.

The communication terminal 10A executes an application supporting the communication system 1 to perform a videoconference with the communication terminal 10B and to remotely control the mobile apparatus 20 via the communication terminal 10B. For example, the communication terminal 10A can control the mobile apparatus 20 provided with the communication terminal 10B to move back and forth, left and right, etc., by operating an operation button displayed on a display screen of the videoconference. In one example, the communication terminal 10A activates browser software to cause the browser software to display a video. In this case, the communication terminal 10A receive an operation instruction for controlling the mobile apparatus 20, the operation instruction being input to the browser software.

A combination of the mobile apparatus 20 and the communication terminal 10B (including the wide-angle image capturing apparatus 9) is referred to as a "telepresence robot". The mobile apparatus 20 is an apparatus that drives a plurality of wheels in response to control from the communication terminal 10B attached to the mobile apparatus 20 to implement a travelling function of performing movement such as "moving forward", "moving backward", "turning to the right", and "turning to the left". The appearance of the mobile apparatus 20 illustrated in FIG. 3 is just an example. The mobile apparatus 20 can be any suitable apparatus, provided that it can move along with the communication terminal 10B in response to an operation instruction from the communication terminal 10B mounted on the mobile apparatus 20.

Further, the mobile apparatus 20 and the communication terminal 10B can be constituted as a single unit. When it is said that the mobile apparatus 20 and the communication terminal 10B is constituted as a single unit, what is meant is that the communication terminal 10B is attached to the mobile apparatus 20 before and after shipment, for example. In addition to or in alternative to the above, when it that the mobile apparatus 20 and the communication terminal 10B is constituted as a single unit, what is meant is that one can recognize from appearance that the communication terminal 10B is a part of the mobile apparatus 20 and that the color, design, manufacturer, and seller are common to the communication terminal 10B and the mobile apparatus 20, for example. In addition to or in alternative to the above, when it that the mobile apparatus 20 and the communication terminal 10B is constituted as a single unit, what is meant is that the mobile apparatus 20 and the communication terminal 10B are inseparable or difficult to separate, or even if they can be separated, some of functions are lost, for example. When the mobile apparatus 20 and the communication terminal 10B are configured as a single unit, the communication terminal 10B is treated as a communication device of the mobile apparatus 20.

When the mobile apparatus 20 and the communication terminal 10B are constituted as a single unit, the wide-angle image capturing apparatus 9 can be also built in the mobile apparatus 20. Alternatively, even when the mobile apparatus 20 and the communication terminal 10B are constituted as a single unit, the wide-angle image capturing apparatus 9 as an external device can be attached to the mobile apparatus 20. When the wide-angle image capturing apparatus 9 is built in the mobile apparatus 20, the wide-angle image capturing apparatus 9 is treated as a wide-angle image capturing unit of the mobile apparatus 20.

In addition, even when the communication terminal 10B as an external device is attached to the mobile apparatus 20, the wide-angle image capturing apparatus 9 can be built in the mobile apparatus 20. Alternatively, when the communication terminal 10B as an external device is attached to the mobile apparatus 20, the wide-angle image capturing apparatus 9 can be also attached as an external device to the mobile apparatus 20.

Further, the wide-angle image capturing apparatus 9 can be either built in the communication terminal 10B or attached as an external device to the communication terminal 10B. When the wide-angle image capturing apparatus 9 is built in the communication terminal 10B, the wide-angle image capturing apparatus 9 is treated as a wide-angle image capturing unit of the communication terminal 10B.

The relay apparatus 30 is, for example, an information processing apparatus or a system including one or more information processing apparatuses. The relay apparatus 30 relays content data such as video data, audio data, and operation instruction information exchanged among the plurality of communication terminals 10. Alternatively, the plurality of communication terminals 10 can directly exchange content data without the relay apparatus 30.

The communication management system 50 is, for example, an information processing apparatus or a system including one or more information processing apparatuses. For example, the communication management system 50 performs login authentication in response to a login request from the communication terminal 10, management of the communication state of the communication terminal 10, management of a destination list, and control of a session in which the plurality of communication terminals 10 communicates with one another via the relay apparatus 30.

In one embodiment, a session is implemented by relaying content data including image data and audio data (voice and other sounds) among the plurality of communication terminals 10 by the relay apparatus 30.

In the above configuration, the operator 810 communicates with the communication terminal 10B using the communication terminal 10A to remotely control the communication terminal 10B and the mobile apparatus 20 to move. As a result, the operator 810 using the communication terminal 10A can control the communication terminal 10B and the mobile apparatus 20 to move close to a desired communication partner and perform a videoconference or the like.

The communication system 1 includes, a data providing system in which one communication terminal 10 transmits content data unidirectionally from to the other communication terminal 10 via the communication management system 50, and a communication system in which a plurality of communication terminals 10 exchange information, emotion, etc. with one another via the communication management system 50. This communication system is a system that allows a plurality of communication terminals to exchange information, emotions, etc. with one another via the relay apparatus 30. Examples of the communication system include a television conferencing system, a videoconferencing system, and a videophone system.

<Hardware Configuration>
<<Hardware Configuration of Communication Terminal 10>>

Figure 4:
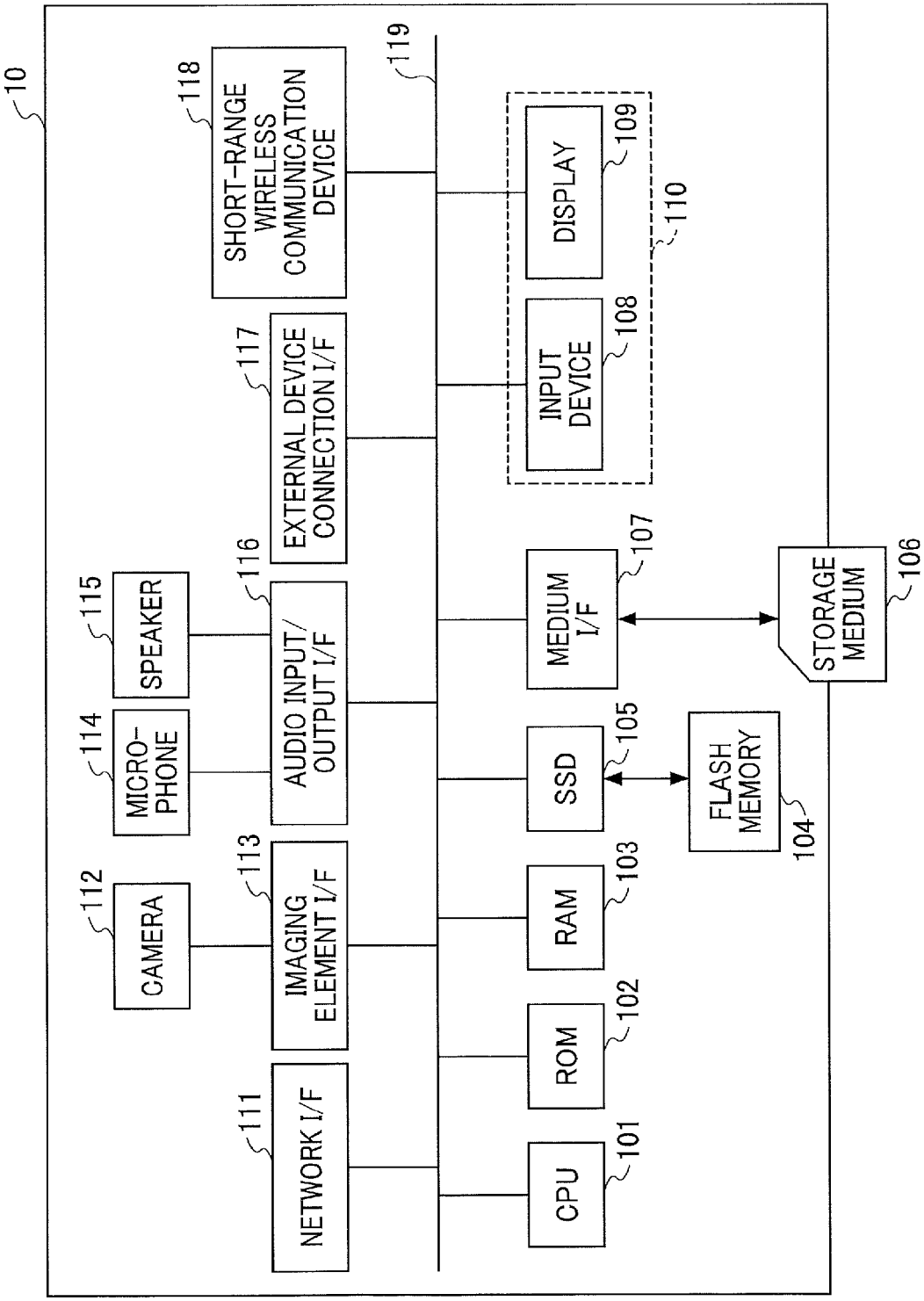
FIG. 4 is a block diagram illustrating an example of a hardware configuration of a communication terminal, according to an embodiment of the present disclosure.

FIG. 4 is a block diagram illustrating an example of a hardware configuration of the communication terminal 10, according to an embodiment of the present disclosure. The communication terminal 10 includes a configuration of a general-purpose computer. For example, the communication terminal 10 includes a central processing unit (CPU) 101, a read only memory (ROM) 102, a random access memory (RAM) 103, a flash memory 104, and a solid state drive (SSD) 105. The communication terminal 10 further includes a medium interface (I/F) 107, an input device 108, a display 109, a network I/F 111, a camera 112, an imaging element I/F 113, a microphone 114, a speaker 115, and an audio input/output I/F 116. The communication terminal 10 further includes an external device connection I/F 117, a short-range wireless communication device 118 and, a bus 119.

The CPU 101 is an arithmetic unit that reads out programs or data from the ROM 102, the flash memory 104 or the like, and executes processing according to the programs or data to implement functions of the communication terminal 10. The ROM 102 is a non-volatile memory in which programs such as an initial program loader (IPL) used for booting the CPU 101 are stored in advance. The RAM 103 is a volatile memory used as a work area for the CPU 101.

The flash memory 104 is a storage device that stores an operating system (OS), application programs, and various types of data. The SSD 105 controls reading or writing of various data from or to the flash memory 104 under control of the CPU 101. The medium I/F 107 controls, for example, reading or writing (storing) data from or to a storage medium 106, which is a recording medium such as a memory card. A program for controlling the communication terminal 10 can be stored in the recording medium.

The input device 108 is a device for receiving an input by an operator of the communication terminal 10. Examples of the input device 108 include a touch panel, a keyboard, and a pointing device. In another example, the input device can be any suitable device that receives an input by voice. The display 109 is a display device that display various information to an operator of the communication terminal 10. The display 109 and the input device 108 can be configured as a single unit, to implement a display input device 110 such as a touch panel display.

The network I/F 111 is a communication interface that allows the communication terminal 10 to transmit and receive data through the communication network 2. The camera 112 includes an imaging element for capturing an image of an object under control of the CPU 101. The imaging element I/F 113 controls image capturing by the camera 112 and converts data of the captured image into predetermined image data. The camera 112 is a planar image capturing device. The camera 112 captures an image at an angle of view that is narrower than an angle of view at which the wide-angle image capturing apparatus 9 captures an image. However, the camera 112 captures an image with a resolution that is higher than a resolution with which the wide-angle image capturing apparatus 9 captures an image. The term "resolution" refers to a degree representing the fineness of a digital image. The resolution is expressed by digitizing the fineness of individual unit points (dots, pixels) constituting the digital image. In general, "dot" is used as a unit representing resolution. The resolution of a display is often represented by the number of dots arranged horizontally and vertically, such as "1024×768 dots". In a case where the wide-angle image capturing apparatus 9 and the camera 112 captures an image of the same imaging area, the number of dots of the image captured by the wide-angle image capturing apparatus 9 is smaller than the number of dots of the image captured by the camera 112.

The microphone 114 collects audio and converts the collected audio into electrical signals. The speaker 115 converts audio signals into audio, and outputs the audio. The audio input/output I/F 116 controls input and output of audio by the microphone 114 and the speaker 115. The external device connection I/F 117 is an interface such as a universal serial bus (USB) for connecting the communication terminal to an external device. Examples of the external device connected via the external device connection I/F 117 include the mobile apparatus 20 illustrated in FIG. 3. The short-range wireless communication device 118 is a communication interface that controls communication of data with an external device (e.g., the mobile apparatus 20) by using a short-range wireless communication network such as Bluetooth (registered trademark) or Bluetooth Low Energy. The bus 119 is connected to each of the above-described hardware elements, and transmits an address signal, a data signal, various control signals, or the like.

<<Hardware Configuration of Communication Management System 50 and Relay Apparatus 30>>

Figure 5:
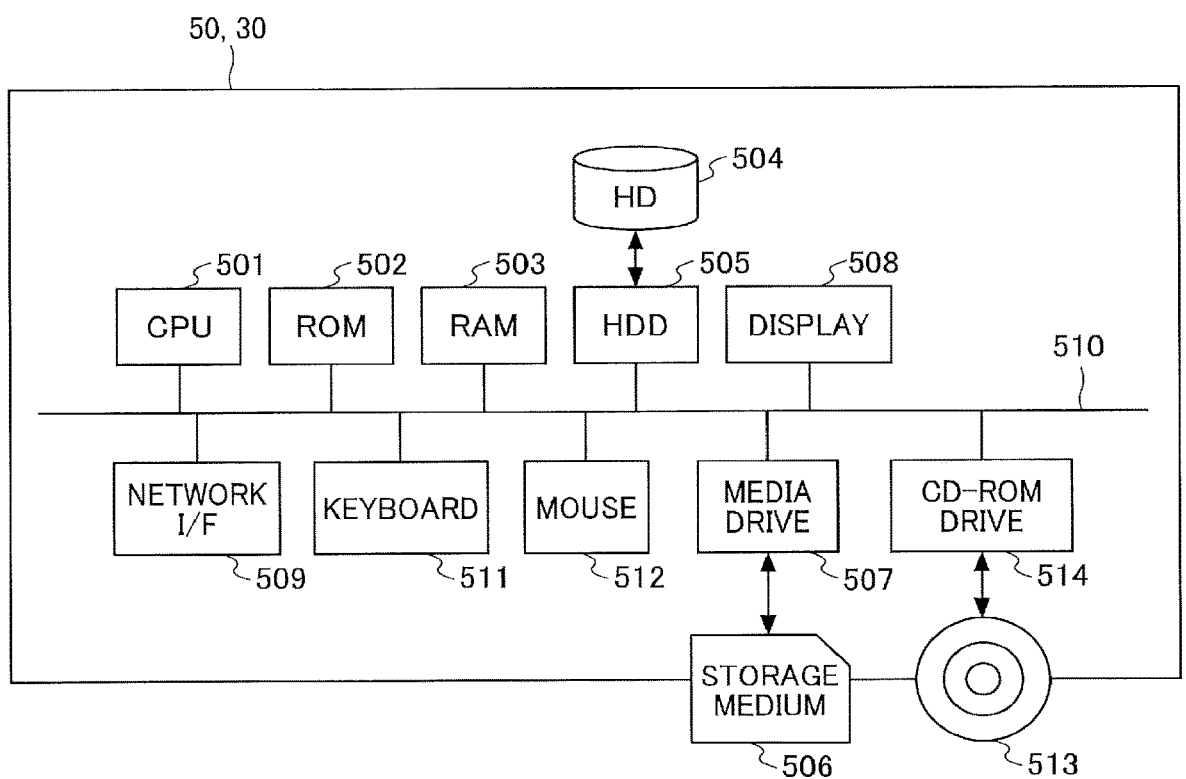
FIG. 5 is a block diagram illustrating an example of a hardware configuration of a communication management system, according to an embodiment of the present disclosure.

FIG. 5 is a block diagram illustrating an example of a hardware configuration of the communication management system 50, according to an embodiment. The communication management system 50 has a configuration of a general-purpose computer. For example, the communication management system 50 includes a CPU 501, a ROM 502, a RAM 503, a hard disc (HD) 504, a hard disc drive (HDD) 505, a media drive 507, and a display 508. The communication management system 50 further includes a network I/F 509, a keyboard 511, a mouse 512, a compact disc-read only memory CD-ROM drive 514, and a bus 510.

The CPU 501 is an arithmetic unit that reads out programs or data from the ROM 502, the HD 504 or the like, and executes processing according to the programs or data to implement functions of the communication management system 50. The ROM 502 is a non-volatile memory in which programs such as an IPL used for booting the CPU 501 are stored in advance. The RAM 503 is a volatile memory used as a work area for the CPU 501.

The HD 504 is a storage device that stores an OS, programs such as application programs, and various types of data. The HDD 505 controls reading or writing of various data from or to the HD 504 under control of the CPU 501. The display 508 is a display device that displays various information such as a cursor, menu, window, characters, or image.

The network I/F 509 is a communication interface that allows the communication management system 50 to communicate data through the communication network 2. The keyboard 511 is one example of an input device that receives inputs such as characters, numerical values, various instructions or the like according to an operation by a system administrator. The mouse 512 is one example of a pointing device that receives inputs such as selection and execution of various instructions, selection of a processing target, and movement of a cursor according to an operation by the system administrator.

The communication management system 50 and/or the relay apparatus 30 does not necessarily always include the display 508, the keyboard 511 and/or the mouse 512. In this case, the display 508, the keyboard 511 and/or the mouse 512 can be connected to the communication management system 50 and/or the relay apparatus 30 as needed.

The media drive 507 controls, for example, reading or writing (storing) data from or to a storage medium 506 such as a memory card. The CD-ROM drive 514 controls reading or writing of data from or to a disc 513, which is one example of removable recording medium. The bus 510 electrically connects the above-described hardware elements with one another such that an address signal, a data signal and various control signals are exchanged between the hardware elements.

The hardware configuration of the computer described above is just one example.

It is assumed that the relay apparatus 30 has the same hardware configuration as that of the communication management system 50. The programs for the communication terminal 10, the relay apparatus 30 and the communication management system 50 can be recorded in an installable or executable file format on a computer-readable storage medium for distribution. Examples of the storage medium include a compact disc recordable (CD-R), a digital versatile disc (DVD), a Blu-ray disc, and a USB memory. In addition, a storage medium such as a CD-ROM storing any of the above-described programs and/or the HD 504 storing any of the above-described programs can be distributed domestically or overseas as a program product.

<<Hardware Configuration of Mobile Apparatus 20>>

Figure 6:
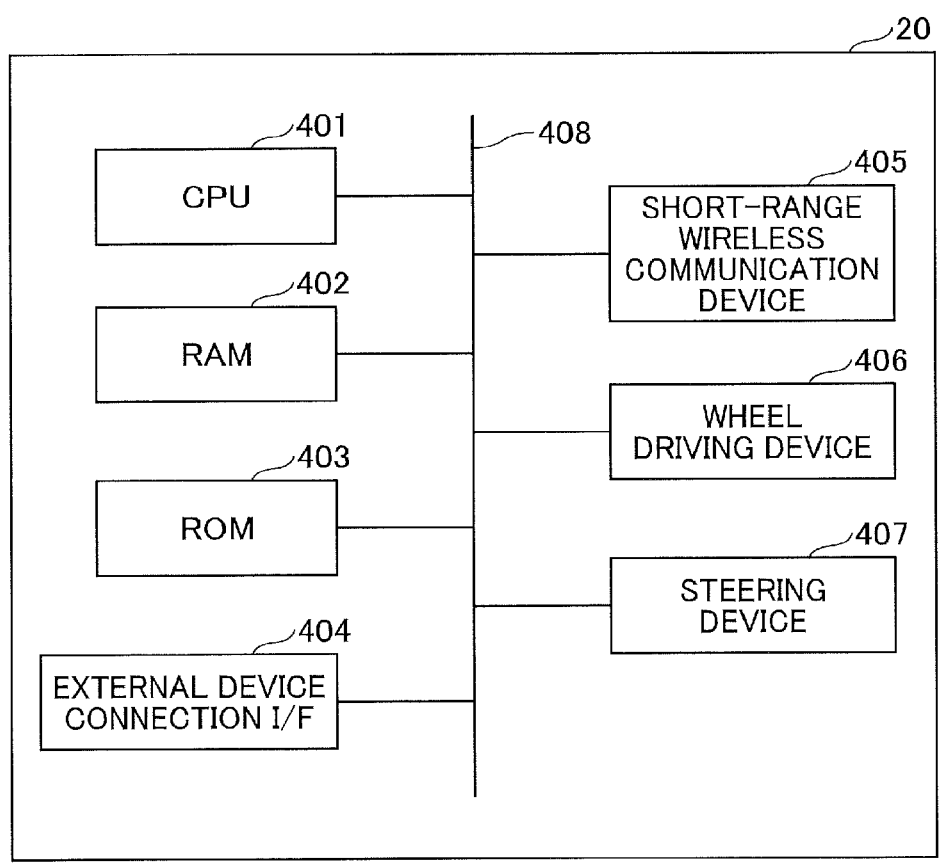
FIG. 6 is a block diagram illustrating an example of a hardware configuration of a mobile apparatus, according to an embodiment of the present disclosure.

FIG. 6 is a block diagram illustrating an example of a hardware configuration of a mobile apparatus 20, according to an embodiment. The mobile apparatus 20 includes, for example, a CPU 401, a RAM 402, a ROM 403, an external device connection I/F 404, a short-range wireless communication device 405, a wheel driving device 406, a steering device 407.

The CPU 401 is an arithmetic unit that executes the program stored in the ROM 403 or the like to implement functions of the mobile apparatus 20. The RAM 402 is a volatile memory used as a work area for the CPU 401. The ROM 403 is a nonvolatile memory storing data such as a program for the mobile apparatus 20. Alternatively, the ROM 403 can be a rewritable non-volatile memory such as a flash ROM.

The external device connection I/F 404 is a wired communication interface for connecting the mobile apparatus 20 to the external device connection I/F 117 or the like of the communication terminal 10 by wire, to allow the mobile apparatus 20 to communicate with an external device such as the communication terminal 10.

The short-range wireless communication device 405 is a wireless communication interface that allows the mobile apparatus 20 to perform wireless communication by the same wireless communication system as a wireless communication system used by the short-range wireless communication device 118 of the communication terminal 10, for example. The mobile apparatus 20 is configured to communicate with the communication terminal 10 via the external device connection I/F 404 or the short-range wireless communication device 405, for example.

The wheel driving device 406 is one example of a driver that drives a wheel or wheels to cause the mobile apparatus 20 to move. The wheel driving device 406 includes, for example, a motor.

The steering device 407 is one example of a steering device that steers the mobile apparatus 20 that is caused to move the wheel driving device 406. For example, the steering device 407 changes the direction or inclination of the wheels. In another example, the steering device 407 changes the direction of the mobile apparatus 20 by controlling the number of rotations or the speed of each of the left and right wheels.

<<Hardware Configuration of Wide-Angle Image Capturing Apparatus 9>>

Figure 7:
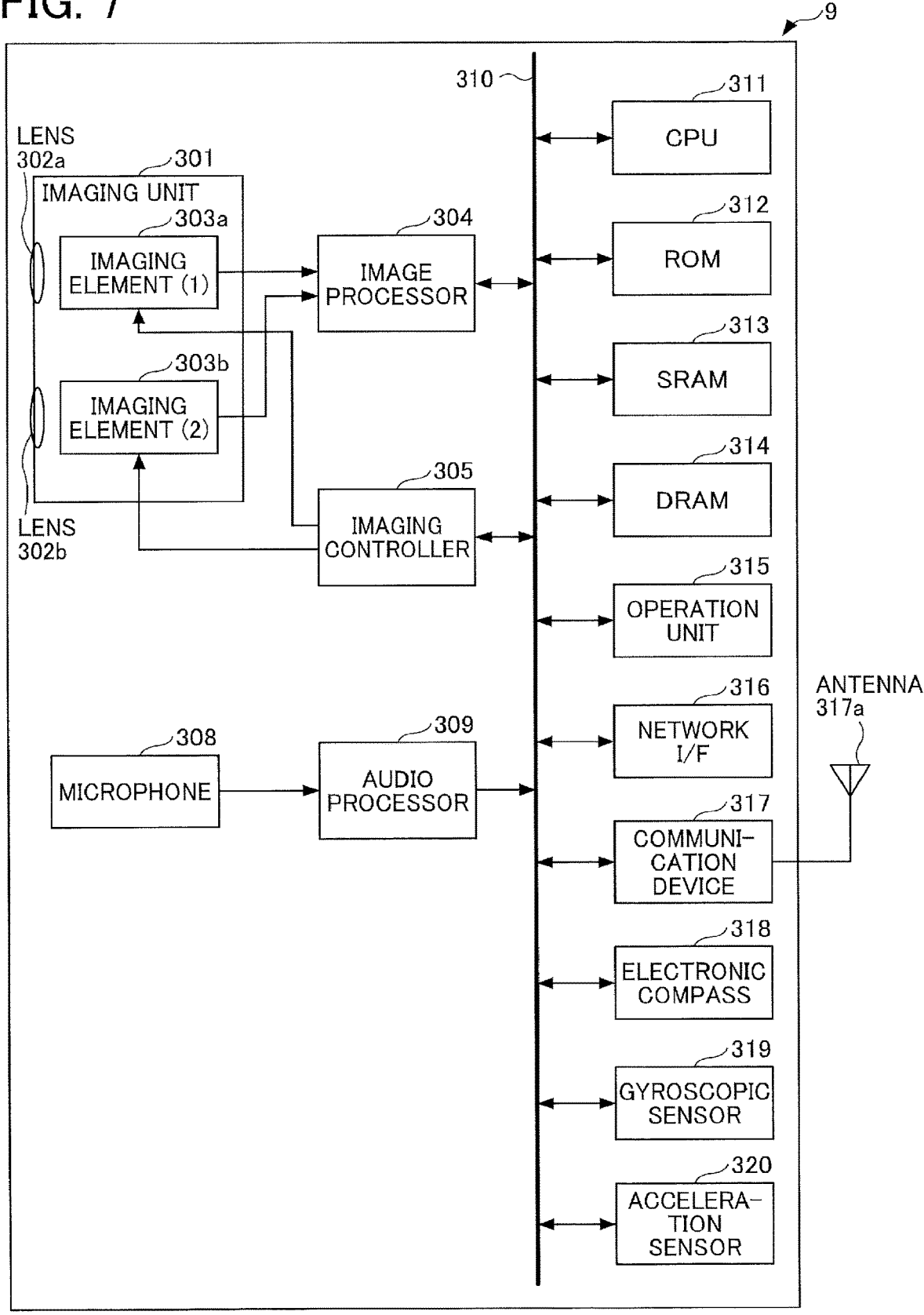
FIG. 7 is a block diagram illustrating an example of a hardware configuration of the wide-angle image capturing apparatus, according to an embodiment of the present disclosure.

Referring to FIG. 7, a hardware configuration of the wide-angle image capturing apparatus 9 is described. FIG. 7 is a block diagram illustrating an example of a hardware configuration of the wide-angle image capturing apparatus 9, according to an embodiment. The following describes a case in which the wide-angle image capturing apparatus 9 is a full-view spherical (omnidirectional) image capturing device having two imaging elements. However, the wide-angle image capturing apparatus 9 can include any suitable number of imaging elements, providing that it includes at least two imaging elements. In addition, the wide-angle image capturing apparatus 9 is not necessarily an image capturing device dedicated to omnidirectional image capturing. Alternatively, an external omnidirectional image capturing unit can be attached to a general-purpose digital camera or a smartphone to implement an image capturing device having substantially the same function as that of the wide-angle image capturing apparatus 9.

As illustrated in FIG. 7, the wide-angle image capturing apparatus 9 includes an imaging unit 301, an image processor 304, an imaging controller 305, a microphone 308, an audio processor 309, a CPU 311, a ROM 312, a static random access memory (SRAM) 313, a dynamic random access memory (DRAM) 314, an operation unit 315, a network I/F 316, a communication device 317, an antenna 317a, an electronic compass 318, a gyroscopic sensor 319, and an acceleration sensor 320.

The imaging unit 301 includes two wide-angle lenses (so-called fisheye lenses) 302a and 302b, each having an angle of view of equal to or greater than 180 degrees to form a hemispherical image. The imaging unit 301 further includes two imaging elements 303a and 303b corresponding to the wide-angle lenses 302a and 302b respectively. Each of the imaging elements 303a and 303b includes an imaging sensor such as a complementary metal oxide semiconductor (CMOS) sensor and a charge-coupled device (CCD) sensor, a timing generation circuit, and a group of registers. The imaging sensor converts an optical image formed by the fisheye lenses 302a and 302b into electric signals to output image data. The timing generation circuit generates horizontal or vertical synchronization signals, pixel clocks and the like for the imaging sensor. Various commands, parameters and the like for operations of the imaging elements 303a and 303b are set in the group of registers.

Each of the imaging elements 303a and 303b of the imaging unit 301 is connected to the image processor 304 via a parallel I/F bus. In addition, each of the imaging elements 303a and 303b of the imaging unit 301 is connected to the imaging controller 305 via a serial I/F bus such as an I2C bus. The image processor 304, the imaging controller 305, and the audio processor 309 are each connected to the CPU 311 via a bus 310. Further, the ROM 312, the SRAM 313, the DRAM 314, the operation unit 315, the network I/F 316, the communication device 317, and the electronic compass 318 are also connected to the bus 310.

The image processor 304 acquires image data from each of the imaging elements 303a and 303b via the parallel I/F bus and performs predetermined processing on each image data. Thereafter, the image processor 304 combines these image data to generate data of an equirectangular projection image as illustrated in FIG. 9C.

The imaging controller 305 usually functions as a master device while each of the imaging elements 303a and 303b usually functions as a slave device. The imaging controller 305 sets commands or the like in the group of registers of each of the imaging elements 303a and 303b via the I2C bus. The imaging controller 305 receives various commands from the CPU 311. Further, the imaging controller 305 obtains status data of the group of registers of each of the imaging elements 303a and 303b via the I2C bus. The imaging controller 305 sends the obtained status data to the CPU 311.

The imaging controller 305 instructs the imaging elements 303a and 303b to output the image data at a time when the shutter button of the operation unit 315 is pressed. In some cases, the wide-angle image capturing apparatus 9 is configured to display a preview image on a display (e.g., the display of the communication terminal 10) or displaying a moving image (movie). In case of displaying movie, image data are continuously output from the imaging elements 303a and 303b at a predetermined frame rate (frames per minute).

Furthermore, the imaging controller 305 operates in cooperation with the CPU 311, to synchronize the time when the imaging element 303a outputs image data and the time when the imaging element 303b outputs the image data. In the present embodiment, the wide-angle image capturing apparatus 9 does not include a display. However, in another example, the wide-angle image capturing apparatus 9 can include a display (display unit).

The microphone 308 converts sound into audio data (signals). The audio processor 309 obtains audio data output from the microphone 308 via an I/F bus and performs predetermined processing on the audio data.

The CPU 311 controls entire operation of the wide-angle image capturing apparatus 9 and performs necessary processing. The ROM 312 stores various programs for execution by the CPU 311. Each of the SRAM 313 and the DRAM 314 operates as a work memory to store programs loaded from the ROM 312 for execution by the CPU 311 or data in current processing. More specifically, in one example, the DRAM 314 stores image data currently processed by the image processor 304 and data of the equirectangular projection image on which processing has been performed.

The operation unit 315 collectively refers to various operation keys, such as a shutter button. An operator operates the operation unit 315 to input various image capturing (photographing) modes or image capturing (photographing) conditions.

The network I/F 316 collectively refers to an interface circuit such as a USB I/F that allows the wide-angle image capturing apparatus 9 to communicate with an external medium such as a secure digital (SD) card or an external personal computer. The network I/F 316 supports at least one of wired and wireless communications. The data of the equirectangular projection image, which is stored in the DRAM 314, is stored in the external medium via the network I/F 316 or transmitted to an external device such as the communication terminal 10B via the network I/F 316, as needed.

The communication device 317 communicates data with an external device such as the communication terminal 10B via the antenna 317a of the wide-angle image capturing apparatus 9 through a short-range wireless communication network such as Wi-Fi, near field communication (NFC), and Bluetooth (registered trademark). The communication device 317 is also configured to transmit the data of equirectangular projection image to an external device such as the communication terminal 10B.

The electronic compass 318 calculates an orientation of the wide-angle image capturing apparatus 9 from the Earth's magnetism to output orientation information. This orientation information is an example of related information, which is metadata described in compliance with Exchangeable image file format (Exif). This information is used for image processing such as image correction of captured images. The related information also includes data of a date and time when an image is captured by the wide-angle image capturing apparatus 9, and a size of image data, for example.

The gyroscopic sensor 319 detects a change in tilt of the wide-angle image capturing apparatus 9 (roll, pitch, yaw), for example, due to movement of the wide-angle image capturing apparatus 9. The change in tilt is one example of related information (metadata) described in compliance with Exif. This information is used for image processing such as image correction of captured images.

The acceleration sensor 320 detects acceleration in three axial directions. The attitude (an angle with respect to the direction of gravity) of the wide-angle image capturing apparatus 9 is detected based on the detected acceleration. Having the gyroscopic sensor 319 and the acceleration sensor 320, the wide-angle image capturing apparatus 9 can correct images with high accuracy.

<Spherical Video>

Figure 8:
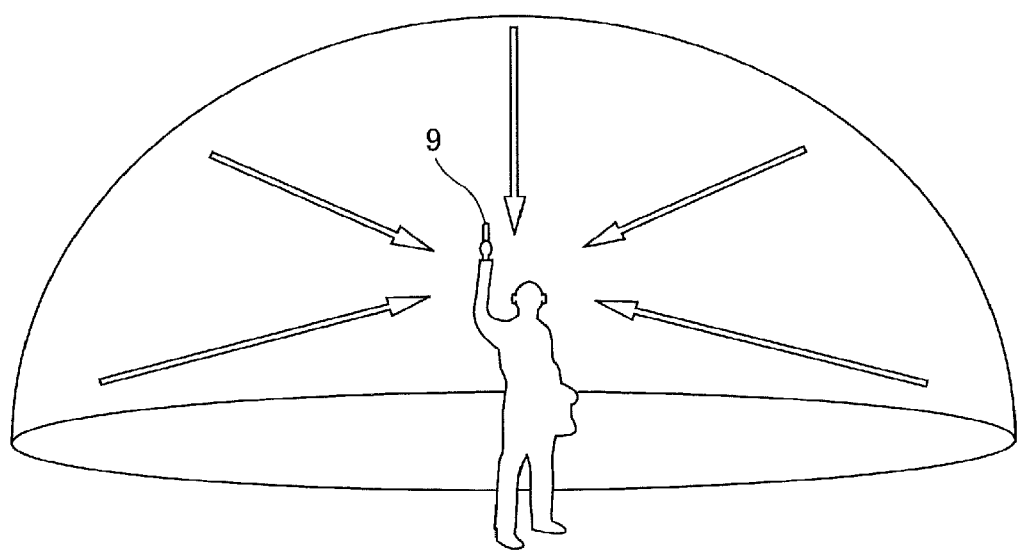
FIG. 8 is an illustration of an example of how a user uses the wide-angle image capturing apparatus, according to an embodiment of the present disclosure.

Next, referring to FIG. 8, a description is given of a situation where the wide-angle image capturing apparatus 9 is used. FIG. 8 illustrates an example of how a user uses the wide-angle image capturing apparatus 9, according to one embodiment. As illustrated in FIG. 8, for example, the wide-angle image capturing apparatus 9 is used for capturing objects surrounding a user who is holding the wide-angle image capturing apparatus in his or her hand. The imaging elements 303a and 303b illustrated in FIG. 7 capture the objects surrounding the user to obtain two hemispherical images.

Figure 9A:
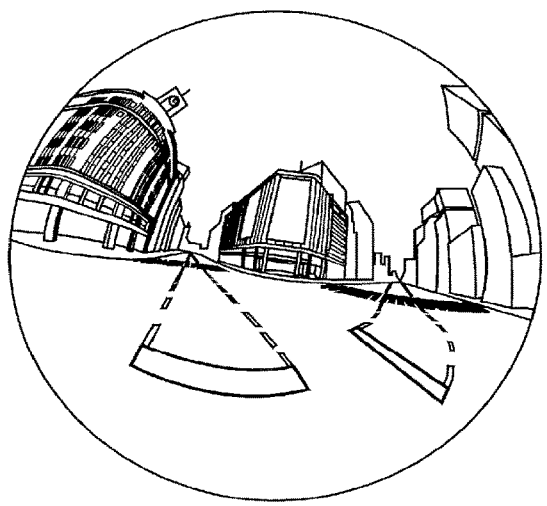
FIG. 9A to FIG. 9C are illustrations for describing an overview of an operation of generating an equirectangular projection image and a spherical image from images captured by the wide-angle image capturing apparatus, according to an embodiment of the present disclosure.
Figure 9B:
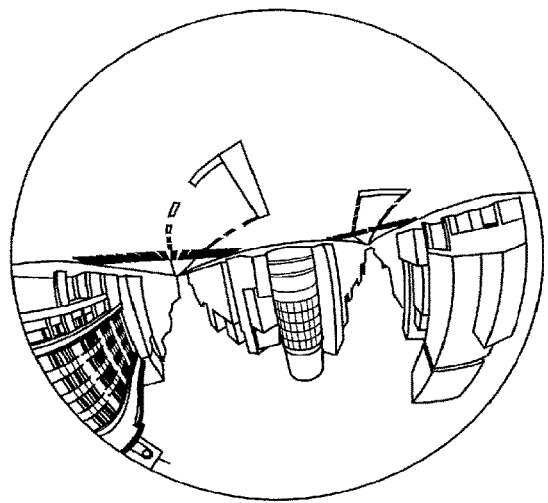
Figure 9C:
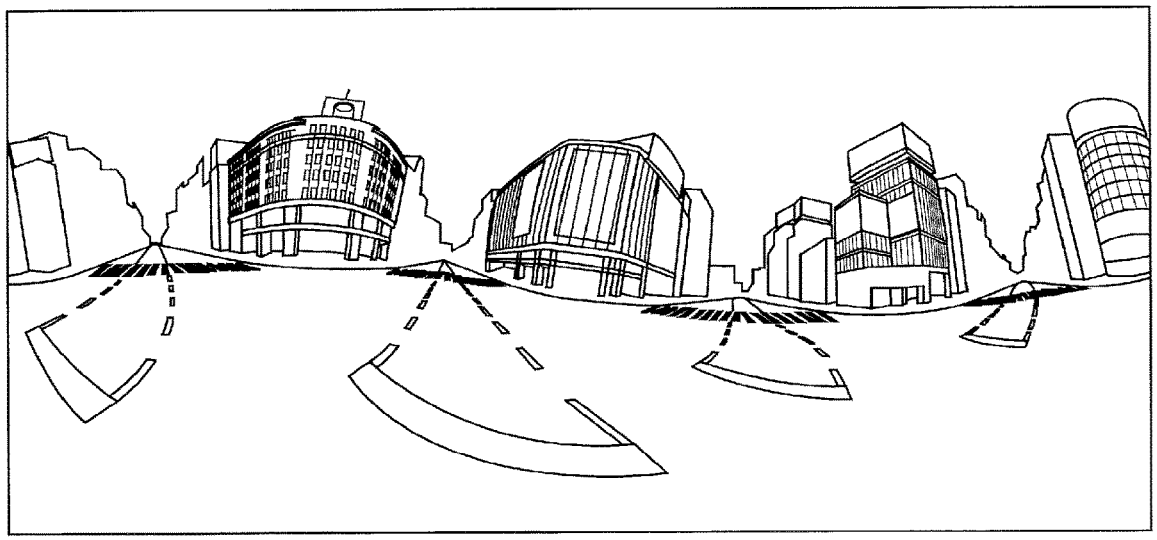
Figure 10A:
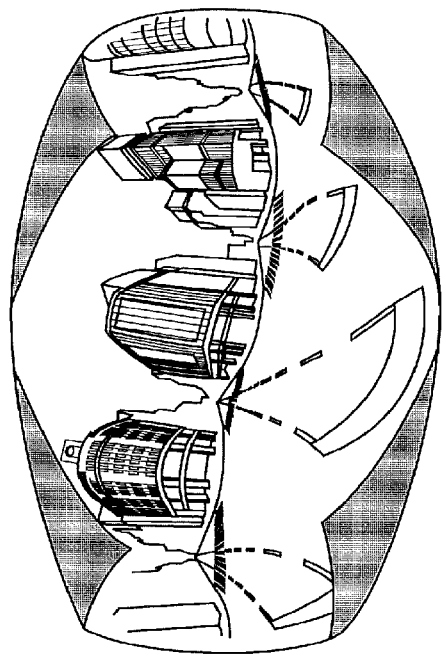
FIGS. 10A and 10B are illustrations for describing an overview of an operation of generating an equirectangular projection image and a spherical image from images captured by the wide-angle image capturing apparatus, according to an embodiment of the present disclosure.
Figure 10A:
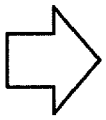
Figure 10A:
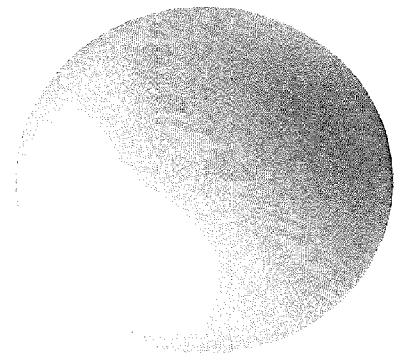
Figure 10B:
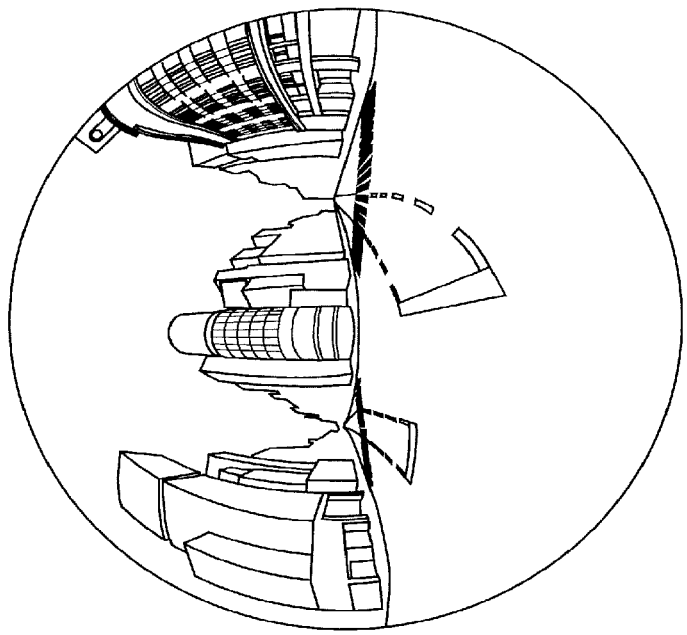

Next, referring to FIGS. 9A to 9C and FIGS. 10A and 10B, a description is given of an overview of an operation of generating an equirectangular projection image EC and a spherical image CE from images captured by the wide-angle image capturing apparatus 9. FIG. 9A is an illustration of one of the two hemispherical images (front side), captured by the wide-angle image capturing apparatus 9. FIG. 9B is an illustration of the other one of the two hemispherical images (back side), captured by the wide-angle image capturing apparatus 9. FIG. 9C is an illustration of an image represented by equirectangular projection. The image represented by equirectangular projection as illustrated in FIG. 9C is, hereinafter, referred to as an "equirectangular projection image" (or "equidistant cylindrical projection image"). FIG. 10A is a conceptual diagram illustrating an example of how the equirectangular projection image maps to a surface of a sphere. FIG. 10B is an illustration of the spherical image.

As illustrated in FIG. 9A, an image captured by the imaging element 303a is a curved hemispherical image (front side) taken through the fisheye lens 302a. Also, as illustrated in FIG. 9B, an image captured by the imaging element 303b is a curved hemispherical image (back side) taken through the fisheye lens 302b. The wide-angle image capturing apparatus 9 combines the hemispherical image (front side) and the hemispherical image (back side), which are reversed by 180-degree from the hemispherical image (front side). This results in generation of the equirectangular projection image EC as illustrated in FIG. 9C.

The equirectangular projection image is mapped on the sphere surface using Open Graphics Library for Embedded Systems (OpenGL ES) as illustrated in FIG. 10A. This results in generation of the spherical image CE as illustrated in FIG. 10B. In other words, the spherical image CE is represented as the equirectangular projection image EC, which corresponds to a surface facing a center of the sphere CS. OpenGL ES is a graphic library used for visualizing two-dimensional (2D) and three-dimensional (3D) data. The spherical image CE is either a still image or a moving image.

Since the spherical image CE is an image attached to the sphere surface, as illustrated in FIG. 10B, a part of the image may look distorted when viewed from the user, providing a feeling of strangeness to the user. To resolve this strange feeling, an image of a predetermined area, which is a part of the spherical image CE, is displayed as a planar image having fewer curves. The predetermined area is, for example, a part of the spherical image CE that is viewable by the user. In this disclosure, the image of the predetermined area is referred to as a "predetermined-area image". Hereinafter, a description is given of displaying the predetermined-area image, with reference to FIG. 11 and FIGS. 12A and 12B.

Figure 11:
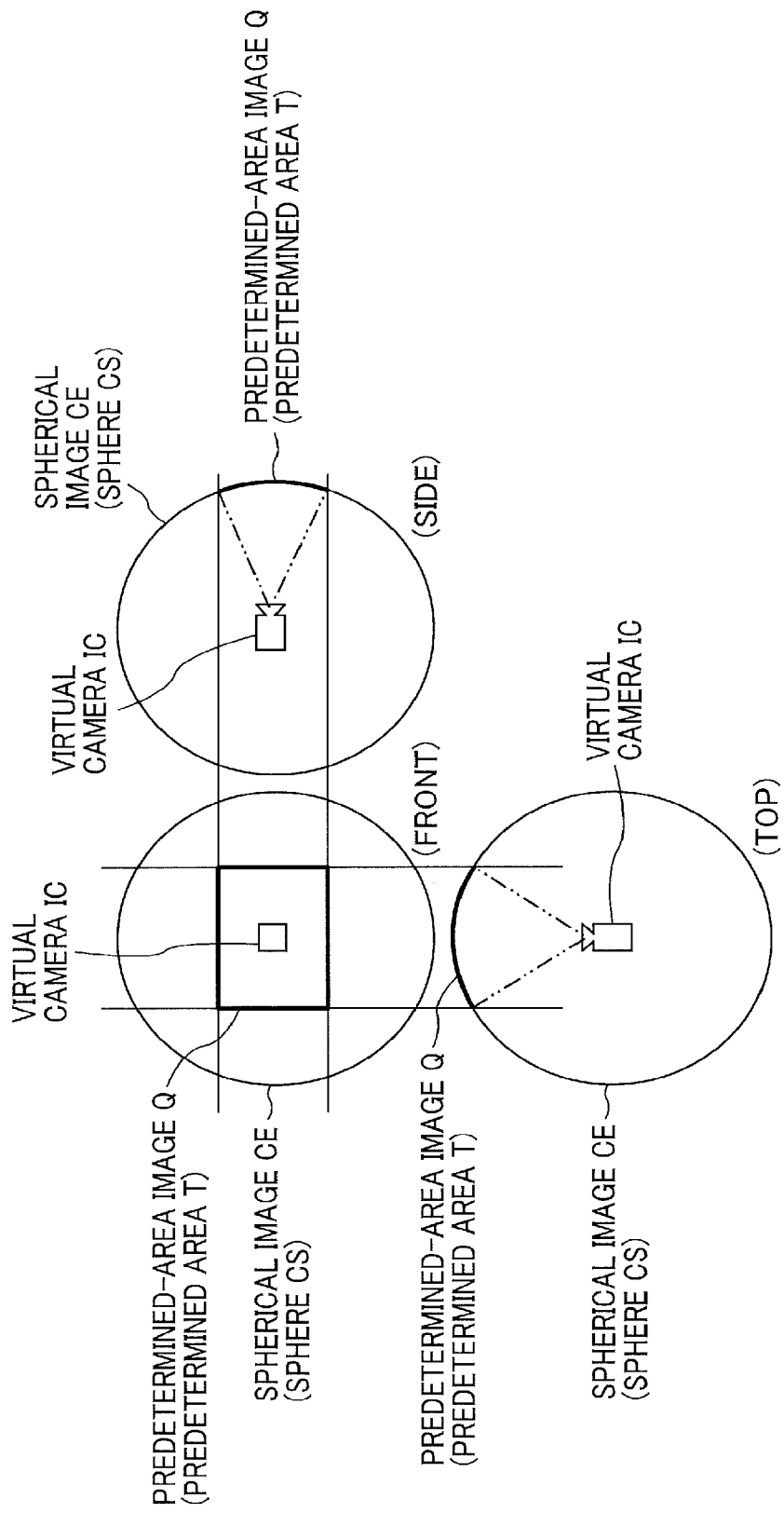
FIG. 11 is an illustration of relative positions of a virtual camera and a predetermined area in a case where the spherical image is represented as a surface area of a three-dimensional solid sphere, according to an embodiment of the present disclosure.
Figure 12A:
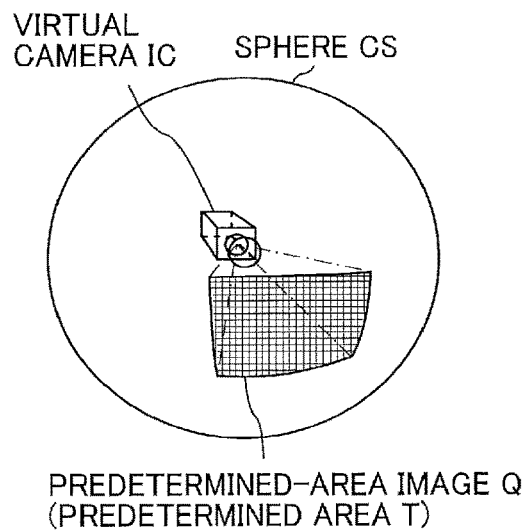
FIG. 12A is a perspective view of FIG. 11.
Figure 12B:
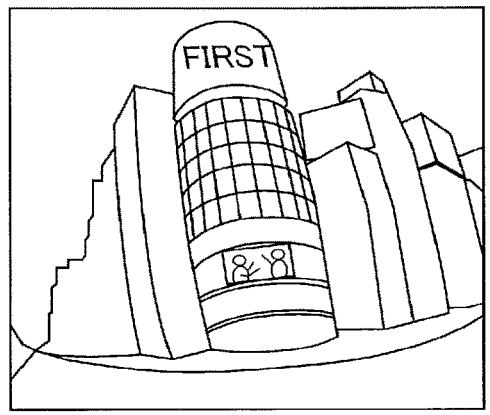
FIG. 12B is an illustration of a predetermined-area image displayed on a display, according to an embodiment of the present disclosure.

FIG. 11 is an illustration of relative positions of a virtual camera IC and a predetermined area T in a case where the spherical image is represented as a surface area of a three-dimensional solid sphere CS. The virtual camera IC corresponds to a position of a point of view (viewpoint) of an operator who is viewing the spherical image CE represented as a surface area of the three-dimensional solid sphere CS. FIG. 12A is a perspective view of FIG. 11. FIG. 12B is an illustration of the predetermined-area image Q displayed on a display. In FIG. 12A, the spherical image CE illustrated in FIG. 11 is represented as a surface area of the three-dimensional solid sphere CS. Assuming that the spherical image CE is a surface area of the solid sphere CS, the virtual camera IC is inside of the spherical image CE as illustrated in FIG. 12. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. In addition, zooming in the predetermined area T can also be determined by bringing the virtual camera IC closer to or away from the spherical image CE. The predetermined-area image Q is an image of the predetermined area T, in the spherical image CE. The predetermined area T is defined by the angle of view a and a distance f from the virtual camera IC to the spherical image CE (see FIG. 13).

The predetermined-area image Q, which is an image of the predetermined area T illustrated in FIG. 12A, is displayed on a display as an image of an imaging area of the virtual camera IC, as illustrated in FIG. 12B. An image illustrated in FIG. 12B is the predetermined-area image Q represented by the predetermined-area information that is set by default. In the following description of the embodiment, an imaging direction (ea, aa) and an angle of view a of the virtual camera IC are used. In another example, the predetermined-area image Q is identified by an imaging area (X, Y, Z) of the virtual camera IC, i.e., the predetermined area T, rather than the angle of view a and the distance f.

Figure 13:
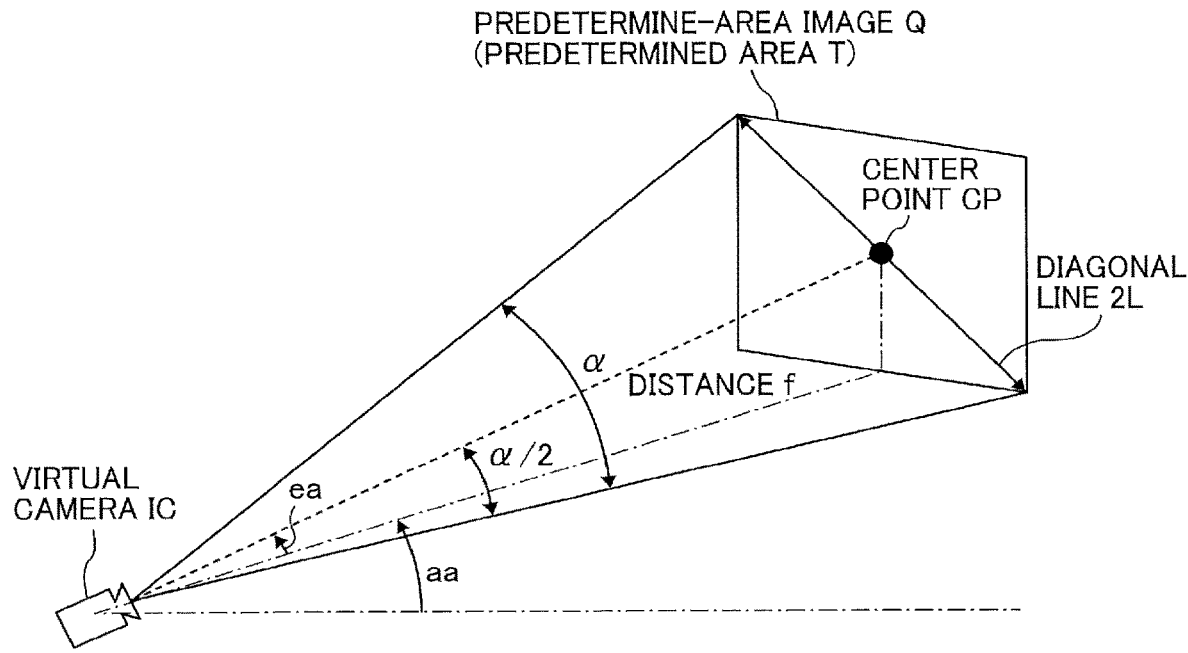
FIG. 13 is a view illustrating a relation between the predetermined-area information and the predetermined area, according to an embodiment of the present disclosure.

Referring to FIG. 13, a relation between the predetermined-area information and the image of the predetermined area T is described according to the embodiment. FIG. 13 is a view illustrating a relation between the predetermined-area information and the predetermined area T, according to one embodiment. As illustrated in FIG. 13, "ea" denotes an elevation angle, "aa" denotes an azimuth angle, and "a" denotes an angle of view. The position of the virtual camera IC is adjusted, such that the point of gaze of the virtual camera IC, indicated by the imaging direction (ea, aa), matches a center point CP of the predetermined area T as the imaging area of the virtual camera IC. As illustrated in FIG. 13, when it is assumed that a diagonal angle of the predetermined area T specified by the angle of view a of the virtual camera IC is a, the center point CP provides the parameters (x, y) of the predetermined-area information. "f" denotes a distance from the virtual camera IC to the center point CP of the predetermined area T. "L" denotes a distance between the center point CP and a given vertex of the predetermined area T (2L is a diagonal line). In FIG. 13, a trigonometric function equation generally expressed by the following equation 1 is satisfied.

$$L/f=\tan(\alpha/2) \quad \text{(Equation 1)}$$

<Functions>

Figure 14A:
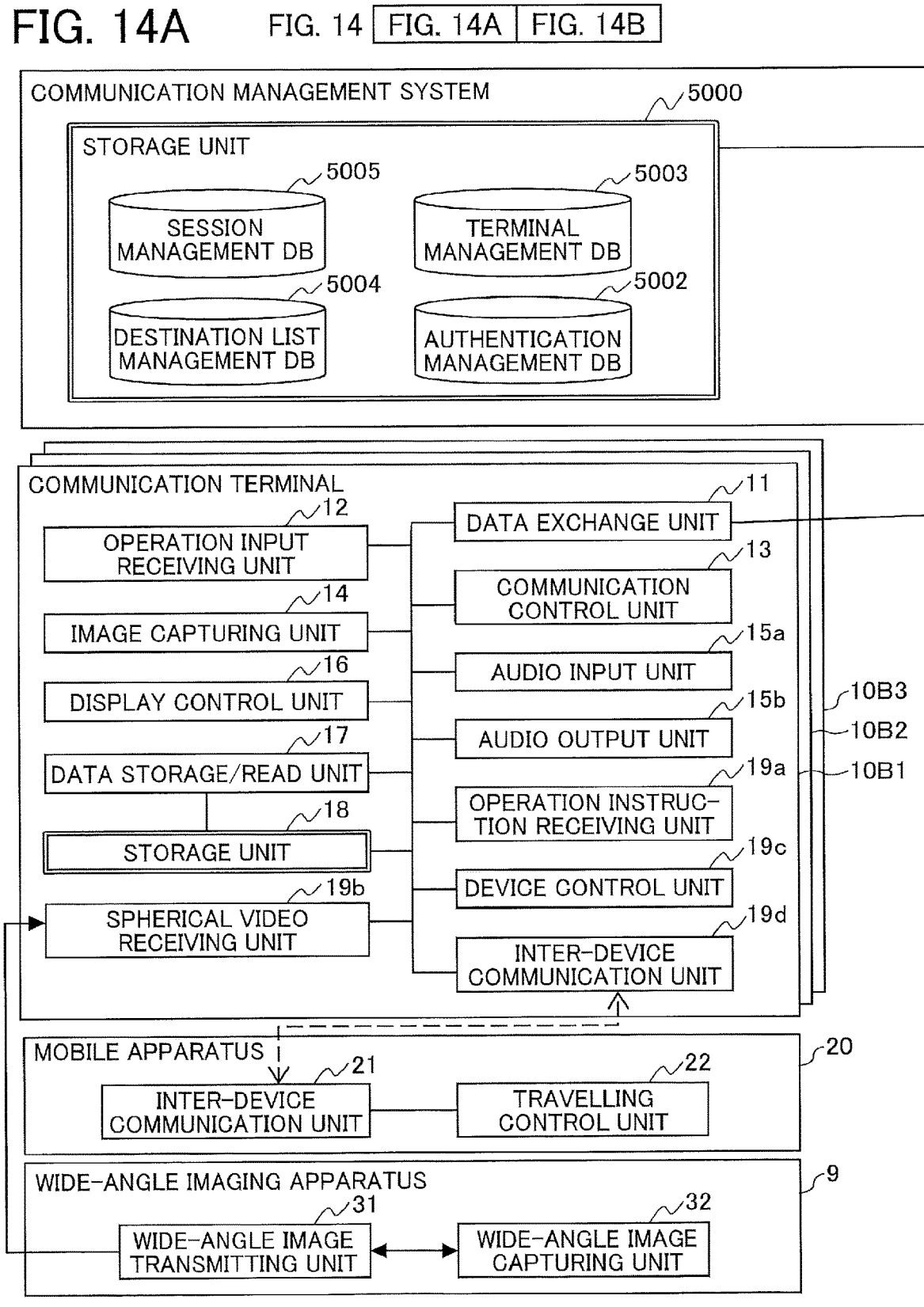
FIG. 14A and FIG. 14B are a block diagram illustrating an example of a functional configuration of the communication management system and the communication terminals of the communication system, according to an embodiment of the present disclosure.
Figure 14B:
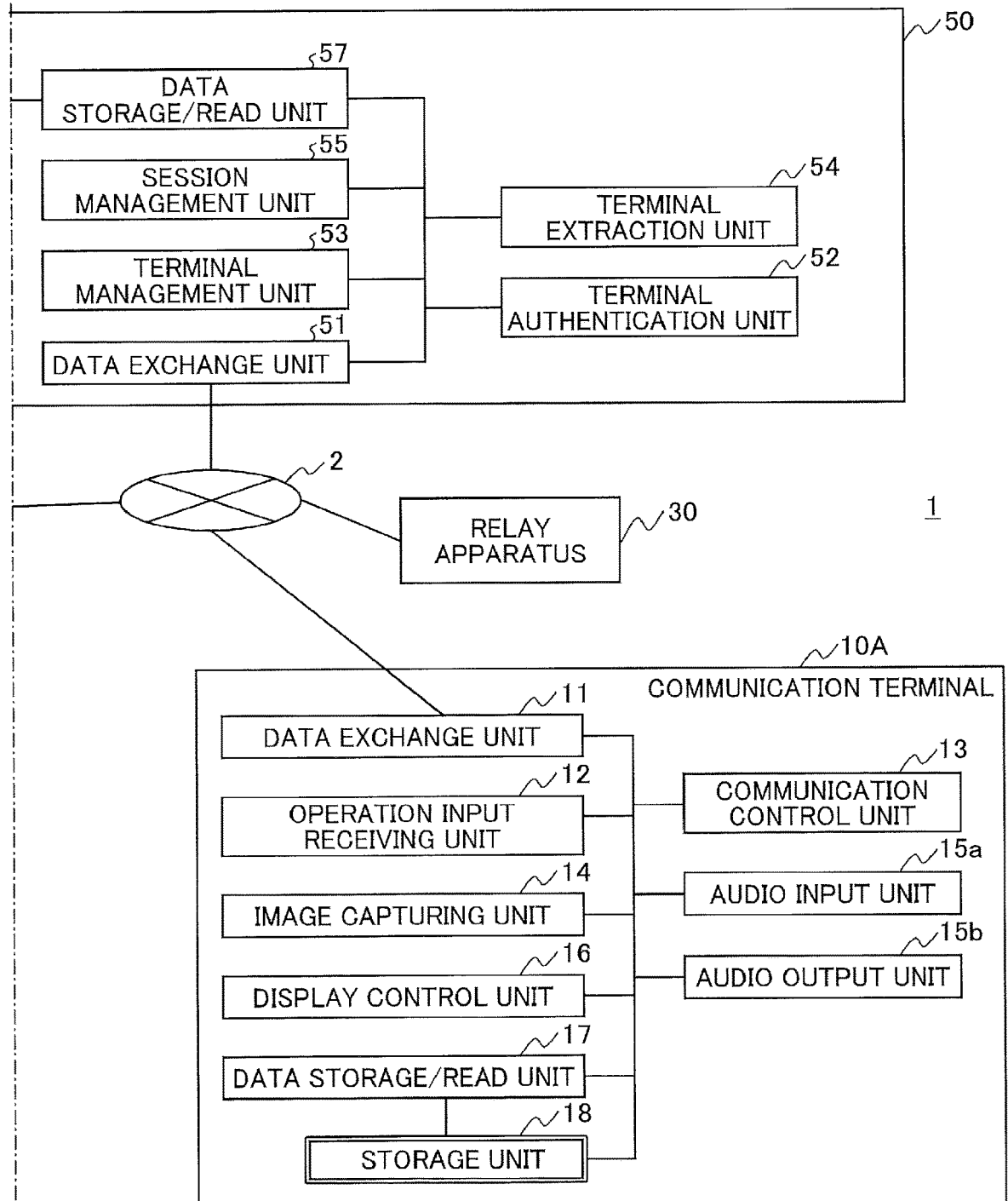

Referring to FIG. 14A and FIG. 14B, the functions of the communication system 1 are described. FIG. 14A and FIG. 14B are a block diagram illustrating an example of a functional configuration of the communication management system 50, the communication terminal 10B, and the communication terminal 10A of the communication system 1.

<<Functional Configuration of Communication Terminal 10A>>

The communication terminal 10A receives an operation instruction for controlling a device such as the mobile apparatus 20. The communication terminal 10A includes a data exchange unit 11, an operation input receiving unit 12, a communication control unit 13, an image capturing unit 14, an audio input unit 15a, an audio output unit 15b, a display control unit 16, and a data storage/read unit 17. These units are functions that are implemented by or that are caused to function by operating any of the hardware components illustrated in FIG. 4 in cooperation with the instructions of the CPU 101 according to the program for the communication terminal 10 expanded from the flash memory 104 to the RAM 103. The communication terminal 10 further includes a storage unit 18, which is implemented by the RAM 103 illustrated in FIG. 4 and the flash memory 104 illustrated in FIG. 4.

<<Functional Configuration of Communication Terminal 10B>>

The communication terminal 10B is a communication terminal 10 mounted on the mobile apparatus 20. The communication terminal 10B is an example of the communication terminal 10 having a function of controlling a device such as the mobile apparatus 20. The communication terminal 10B includes, in addition to the functional configuration of the communication terminal 10A described above, an operation instruction receiving unit 19a, a spherical video receiving unit 19b, a device control unit 19c, and an inter-device communication unit 19d. It should be noted that the communication terminal 10A also includes these additional functions.

(Each functional Unit of Communication Terminal 10) A detailed description is now given of each of the functional units of the communication terminal 10 (communication terminal 10A and communication terminal 10B).

The data exchange unit 11 transmits and receives various data (or information) to and from another (counterpart) communication terminal, device or system via the communication network 2. Before starting communication with a desired counterpart terminal, the data exchange unit 11 starts receiving state information indicating the state of each of the communication terminals as candidate counterparts, from the communication management system 50. The state information indicates the operating state of each of the communication terminals 10, e.g., whether the communication terminal is online or offline. When the operating state is online, the state information further indicates a detailed state such as whether the terminal is currently available for communication of is now currently communicating, or is currently busy (e.g., communicating with another counterpart).

The data exchange unit 11 of the communication terminal 10A receives the first video transmitted by the communication terminal 10B (or the communication device of the communication terminal 10B) and a spherical video captured by the wide-angle image capturing apparatus 9, which is connected to the communication terminal 10B or the mobile apparatus 20, or which is configured as a part of the communication terminal 10B or the mobile apparatus 20.

The operation input receiving unit 12 receives various inputs to the communication terminal 10 from the operator. For example, when the operator performs an operation of turning on the power of the communication terminal 10, the operation input receiving unit 12 receives the operation and turns on the power.

In response to the reception of the power on operation, the communication control unit 13 controls the data exchange unit 11 to automatically transmit, to the communication management system 50 via the communication network 2, login request information indicating a request for login and the current IP address of a request sender terminal, which is the communication terminal that sends the login request information. In addition, when the operator performs an operation of turning off the power of the communication terminal 10, the data exchange unit 11 transmits, to the communication management system 50, state information indicating that the power is to be turned off, and then the operation input receiving unit 12 turns off the power. Accordingly, the communication management system 50 can detect that the power of the communication terminal 10 is turned from on to off.

Further, the communication control unit 13 performs various communication controls such as establishment and disconnection of a session which the communication terminal 10 exchanges content data with one or more of the other communication terminals via the relay apparatus 30. The communication control unit 13 according to the present embodiment includes a communication identification (ID) of the communication terminal 10 in session control information (e.g., start request information, start response information, etc., described below), and transmits the session control information including the communication ID to the communication management system 50.

The communication ID is an example of identification information of an account that can participate in a session in which the communication terminals 10 exchange content data with one another. Examples of the communication ID include a user ID as identification information of the operator, an application ID as identification information of an application, a contract ID as identification information of a contractor of the communication terminal 10. For example, a combination of at least two of character(s), number(s), symbol(s), and various marks can be used as the communication ID. In another example, an email address can be used as the communication ID.

The image capturing unit 14 converts image data obtained by imaging an object into predetermined image (video) data and outputs the image (video) data. Two imaging capturing units 14 are provided, one being provided on the front side of the communication terminal 10 and the other one being provided on the back side of the communication terminal 10. The image capturing unit 14 provided on the front side is used for capturing a front-side video. The image capturing unit 14 provided on the back side is used for capturing a rear-side video. There may be three or more image capturing units 14.

After voice sound of the operator is converted to audio signals by the microphone 114, the audio input unit 15a converts the audio signals to predetermined audio data and outputs the audio data. The audio output unit 15b converts audio data into audio signals and outputs the audio signals to the speaker, to control the speaker 115 to audio corresponding to the audio signals.

The display control unit 16, for example, controls the display 109 or the display input device 110 to display an image (video) based on image data included in content data received by the communication terminal 10. Further, the display control unit 16 transmits information of a destination list received from the communication management system 50 to the display 109, to control the display 109 to display the destination list.

The display control unit 16 of the communication terminal 10A performs controls so that at least one of a front-side video and a rear-side video received by the data exchange unit 11 is displayed, and displays the mobile apparatus operation button 614 for controlling the mobile apparatus 20 as being superimposed on the front-side video or the rear-side video.

The data storage/read unit 17 stores various types of data in the storage unit 18 or reads out various types of data stored in the storage unit 18.

The storage unit 18 stores authentication information such as the above-described communication ID and a password corresponding to the communication ID. Further, image data and audio data currently stored in the storage unit 18 are overwritten with new image data and audio data every time the new image data and audio data are received in performing communication with a counterpart terminal. The display 109 displays an image based on the image data currently stored, and the speaker 115 outputs audio based on the audio data currently stored.

A description is now given of each of the functional unit of the communication terminal 10B.

The spherical video receiving unit 19b receives an equirectangular projection video from the wide-angle image capturing apparatus 9 by wireless communication such as Bluetooth (registered trademark) or wired communication such as a USB cable. The equirectangular projection video is a moving image that is repeatedly transmitted with a frequency that can be regarded as a moving image. In another example, the equirectangular projection image can be a still image. In still another example, a moving image and a still image can be switched.

The operation instruction receiving unit 19a receives, via the data exchange unit 11, operation instruction information for requesting control a device (mobile apparatus 20) to the communication terminal 10B from the communication terminal 10A. The operation instruction information includes, for example, a communication ID of the communication terminal 10 that transmits the operation instruction information, and an operation instruction indicating the control content to be requested.

The device control unit 19c controls the mobile apparatus 20 based on the operation instruction included in the operation instruction information received by the operation instruction receiving unit 19a. The inter-device communication unit 19d communicates with the mobile apparatus 20 by using the short-range wireless communication device 118.

<Functional Configuration of Mobile Apparatus 20>

The mobile apparatus 20 includes, for example, an inter-device communication unit 21 and a traveling control unit 22. The inter-device communication unit 21 is implemented by, for example, the external device connection I/F 404 or the short-range wireless communication device 405 illustrated in FIG. 6, each of which operates according to instructions of the CPU 401. In the present embodiment, it is assumed that the inter-device communication unit 21 communicates with the communication terminal 10B by using the short-range wireless communication device 405.

The traveling control unit 22 controls the wheel driving device 406 and the steering device 407 illustrated in FIG. 6 based on the control content acquired from the communication terminal 10A, to control movement (travelling) of the mobile apparatus 20 such as moving forward, moving backward, turning to the left, and turning to the right.

<<Functional Configuration of Wide-angle Image Capturing Apparatus 9>>

The wide-angle image capturing apparatus 9 includes, for example, a wide-angle image transmitting unit 31 and a wide-angle image capturing unit 32. The wide-angle image capturing unit 32 captures a 360-degree wide-angle equirectangular projection video at a predetermined frame rate. In another example, the wide-angle image capturing unit 32 can capture a still image. The wide-angle image transmitting unit 31, which is implemented by the communication device 317 illustrated in FIG. 7, transmits an equirectangular projection video as a moving image or a still image to the communication terminal 10B.

<<Functional Configuration of Communication Management System 50>>

The communication management system 50 includes a data exchange unit 51, a terminal authentication unit 52, a terminal management unit 53, a terminal extraction unit 54, a session management unit 55, a data storage/read unit 57. These units are functions that are implemented by or that are caused to function by operating any of the hardware components illustrated in FIG. 5 in cooperation with the instructions of the CPU 501 according to the program for the communication management system 50 expanded from the HD 504 to the RAM 503. The communication management system 50 further includes a storage unit 5000 implemented by, for example, the HD 504 illustrated in FIG. 5.

(Each Functional Unit of Communication Management System 50)

A detailed description is now given of each of the functional units of the communication management system 50. The data exchange unit 51 transmits and receives various data (or information) to and from another (counterpart) communication terminal, device or system via the communication network 2.

The terminal authentication unit 52 performs authentication of the communication terminal 10 by determining whether a set of the communication ID and the password included in the login request information received via the data exchange unit 51 is stored in an authentication management database (DB) 5002.

The terminal management unit 53 stores, in a terminal management DB 5003, for each of the communication IDs, a destination name, an operating state, a date and time when the request information or like is received, and an IP address of a request sender terminal, which is a communication terminal that sends the request information, in association with one another. For example, the terminal management unit 53 changes the operating state of the terminal management DB 5003 from Online to Offline, based on state information indicating that the power is turned off, the state information being transmitted from the communication terminal 10 in response to the operator's operation of turning the power of the communication terminal 10 from on to off.

The terminal extraction unit 54 searches a destination list management DB 5004 using the communication ID of the a request sender terminal that has sent a login request as a search key, to extract the communication ID of a counterpart terminal that can communication with the request sender terminal. Further, the terminal extraction unit 54 searches the destination list management DB 5004 to extract the communication ID of another (counterpart) communication terminal that has registered the communication ID of the request sender terminal as a candidate of the counterpart terminal.

Furthermore, the terminal extraction unit 54 searches the terminal management DB 5003 using the extracted communication ID of the counterpart terminal candidate as a search key, to read out the operating state associated with each extracted communication ID. Accordingly, the terminal management unit 53 can obtain the operating state of the counterpart terminal candidate that can communicate with the request sender terminal that has sent a login request. Further, the terminal management unit 53 searches the terminal management DB 5003 by using the communication ID of the request sender terminal as a search key, to acquire the operating state of the request sender terminal that has sent a login request.

The session management unit 55 controls a session managed by the communication management system 50. The control of session includes, for example, control for establishing a session, control for causing the communication terminal 10 to participate in the established session, control for disconnecting the session, and generation of a session ID. In addition, the session management unit 55 stores, in a session management DB 5005, the communication ID of the communication terminal 10 that has requested the start of a session, the communication ID of the counterpart terminal, in association with a session ID, which is identification information of a session.

The data storage/read unit 57 is implemented by the HDD 505 illustrated in FIG. 5 according to instructions of the CPU 501. Alternatively, the data storage/read unit 57 is implemented by instructions of the CPU 501. The data storage/read unit 57 stores various types of data in the storage unit 5000 and reads out various types of data from the storage unit 5000.

Example of Information Managed by Communication Management System 50

A description is now given of each of the management DBs stored in the storage unit 5000 of the communication management system 50.

TABLE 1

| Authentication Management Table: | |
| --- | --- |
| Communication ID | Password |
| 01aa | aaaa |
| 01ab | abab |
| 01ba | baba |

Table 1 is an example of an authentication management table 602 included in the authentication management DB 5002 stored in the storage unit 5000 of the communication management system 50. The authentication management table 602 stores communication IDs of the communication terminals 10 managed by the communication management system 50 in association with corresponding passwords. For example, the authentication management table 602 of Table 1 indicates that the password corresponding to the communication terminal 10 identified by the communication ID "01aa" is "aaaa".

TABLE 2

| Terminal Management Table: | | | | |
| --- | --- | --- | --- | --- |
| Communication ID | Destination Name | Opaerating State | Reception Date and Time | IP Address of Terminal |
| 01aa | Japan, Head office, AA terminal | Online (Available for communication) | 20xx.4.10 13:40 | 1.2.1.3 |
| 01b1 | United States, First research laboratory, AB terminal | Online (Available for communication) | 20xx.4.10 13:40 | 1.2.1.4 |
| 01b2 | United States, NY company-owned store, AC terminal | Online (Available for communication) | 20xx.4.10 9:50 | 1.2.1.5 |
| 01b3 | China, First factory, AD terminal | Online (Communicating) | 20xx.4.10 11:42 | 1.2.1.5 |
| . . . | . . . | . . . | . . . | . . . |

Table 2 is an example of a terminal management table 603 included in the terminal management DB 5003 stored in the storage unit 5000 of the communication management system 50. The terminal management table 603 stores, for each of the communication IDs of the communication terminals 10, the communication ID of the communication terminal, a destination name in a case where the communication terminal 10 serves as a counterpart terminal, the operating state of the communication terminal 10, a date and time when login request information described below is received at the communication management system 50, and the IP address of the communication terminal 10, in association with one another. For example, the terminal management table 603 of Table 2 indicates that a terminal name of the communication terminal 10 identified by the communication ID "01aa" is "Japan headquarters" and the operating state of this communication terminal is "Online (available for communication). Further, this terminal management table 603 indicates that the date and time when the communication management system 50 receives the login request information from the communication terminal 10 identified by the communication ID "01aa" is "13:40 on Apr. 10, 20xx" and the IP address of this communication terminal is "1.2.1.3".

TABLE 3

Destination List Management Table:

| Communciation ID of Request Sender Terminal | Communication ID of Counterpart Terminal Candidate |
| --- | --- |
| 01aa | 01b1, 01b2, 01b3 |
| 01b1 | 01aa |
| 01b2 | 01aa |
| 01b3 | 01aa |
| ... | ... |
| 01bd | 01ab, 01ba, ..., 01da, 01ca, 01cb, ..., 01da |

Table 3 is an example of a destination list management table 701 included in the destination list management DB 5004 stored in the storage unit 5000 of the communication management system 50. The destination list management table 701 stores the communication IDs of request sender terminals, each of which sends a request for starting communication in videoconference in association with the communication IDs of all counterpart terminals registered as counterpart terminal candidates. For example, the destination list management table 701 of Table 3 indicates that counterpart terminal candidates to which a request sender terminal identified by the communication ID "01aa" can send a request for starting communication are the communication terminals identified by the communication IDs "01b1", "01b2" and "01b3", respectively. The counterpart terminal candidates stored in the destination list management table 701 are updated by addition or deletion performed by the communication management system 50 in response to an addition or deletion request transmitted from an arbitrary request sender terminal to the communication management system 50.

With this configuration, the request sender terminal (for example, the communication terminal identified by "01aa") can start communication only with the counterpart terminal candidate (for example, the communication terminal identified by "01b1") registered in advance. This counterpart terminal (for example, the communication terminal identified by "01b1") is not allowed to communicate with the request sender terminal (for example, the communication terminal identified by "01aa") unless this request sender terminal is registered in the destination list management table 701 as a counterpart terminal. This configuration is preferable because the possibility of communication between unexpected communication terminals 10 can be reduced. Alternatively, an arbitrary communication terminal 10 can communicate with a desired another (counterpart) communication terminal without in-advance registration in the destination list management table 701.

TABLE 4

Session Management Table:

| Session ID | Relay Apparatus ID | Communication ID of Request Sender Terminal | Communication ID of Counterpart Terminal | Session Participation Date and Time |
| --- | --- | --- | --- | --- |
| se1 | 111a | 01aa | 01b1 | 20xx/04/10 13:45:30 |
|  |  |  | 01b2 | 20xx/04/10 13:50:30 |
| se2 | 111a | 01ad | 01ca | 20xx/04/10 13:11:11 |
| ... | ... | ... | ... | ... |

Table 4 is an example of a session management table 702 included in the session management DB 5005 stored in the storage unit 5000 of the communication management system 50. The session management table 702 stores, for each session ID as identification information of a session, a relay apparatus ID of the relay apparatus 30 to be used for relaying data, the communication ID of a request sender terminal, the communication ID of a counterpart terminal, and a session participation date and time, in association with one another. For example, the session management table 702 of Table 4 indicates that a session identified by the session ID "se2" is performed between a request sender terminal identified by the communication ID "01ad" and a counterpart terminal identified by the communication ID "01ca". This session management table 702 further indicates that the session identified by the session ID "se2" is started at "20xx/4/10, 13:11:11" via the relay apparatus 30 identified by a relay apparatus ID "111b".

<Processes>

A description is now given of processes in an operation performed by the communication system 1.

(Preparation Processes)

Figure 15B:
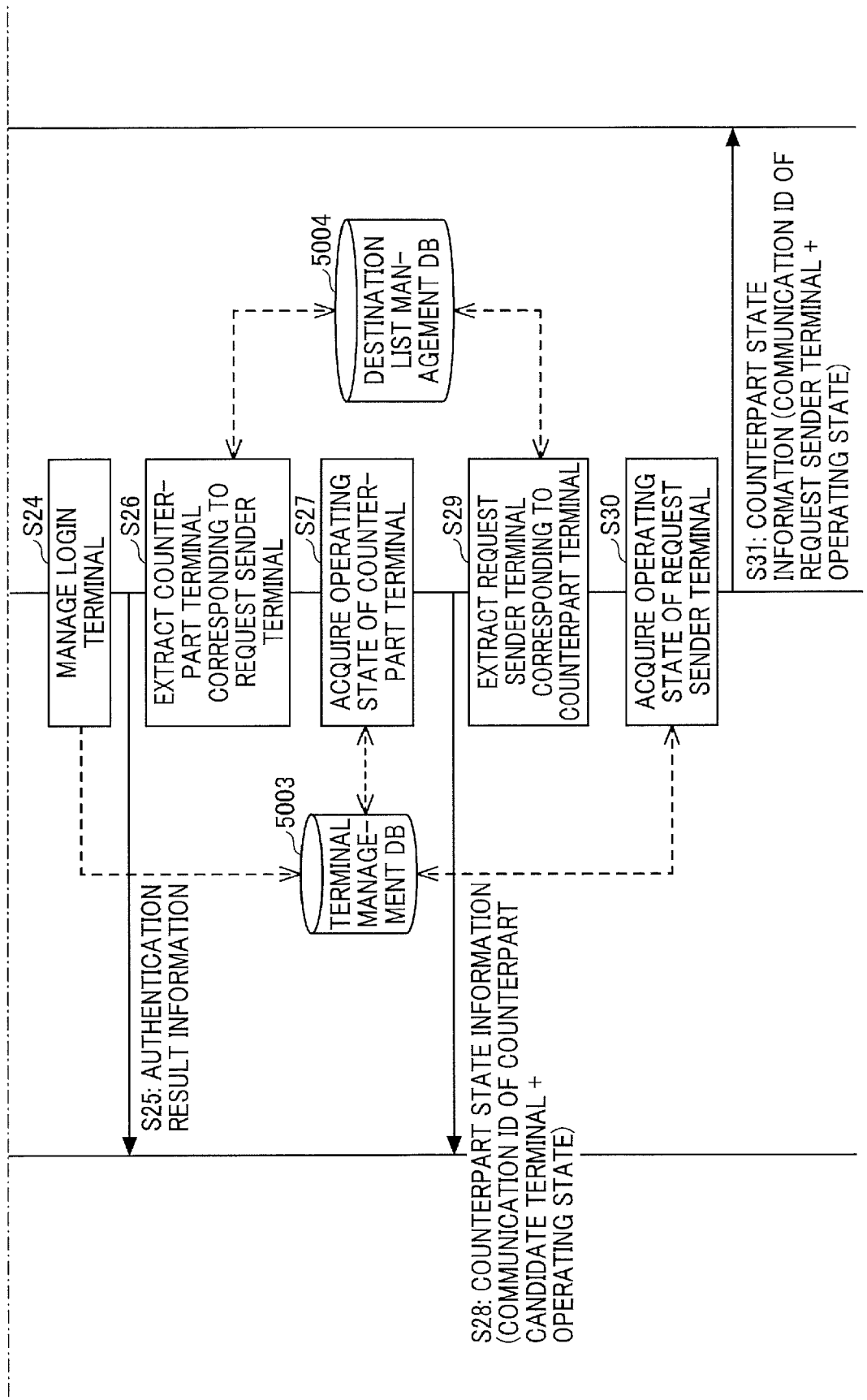

FIG. 15A and FIG. 15B are a sequence diagram illustrating an example of processes in a communication preparation stage, performed by the communication system 1. In the present embodiment, a description is given of processes in a preparation stage performed before a session between the communication terminal 10A and the communication terminal 10B1 is started, as an example. The following description is provided on the assumption that the communication ID of the communication terminal 10A is "01aa" and the communication ID of the communication terminal 10B1 is "01b".

First, when an operator of the communication terminal 10A, which is a request sender terminal, performs an operation of turning on the power of the communication terminal 10A, for example, the operation input receiving unit 12 receives this operation of turning on the power and turns of the power of the communication terminal 10A (step S21).

In response to the power being turned on as above, the communication control unit 13 transmits login request information for requesting a login from the data exchange unit 11 to the communication management system 50 via the communication network 2 (step S22). The operation of turning on the power of the communication terminal 10A is just one example of a trigger by which the communication control unit 13 transmits the login request information. In another example, the login request information can be transmitted in response to an operation to the input device 108 by the operator. In still another example, the login request information can be transmitted in response to activation of an application.

The login request information includes a communication ID for identifying the communication terminal 10a, which is a local terminal as the request sender terminal, and a password. These communication ID and password are information read from the storage unit 18 by the data storage/read unit 17, for example. In addition, when the login request information is transmitted from the communication terminal 10A to the communication management system 50, the communication management system 50, which is a receiving side, receives an IP address of the communication terminal 10a, which is a transmitting side.

Next, the terminal authentication unit 52 of the communication management system 50 searches the above-described authentication management table 602 by using the communication ID and the password included in the login request information received via the data exchange unit 51 as search keys. The terminal authentication unit 52 performs authentication based on whether a set of the communication ID and the password included in the login request information received from the communication terminal 10A is stored in the authentication management table 602 (step S23).

When the terminal authentication unit 52 determines that a request indicated by the login request information is a login request from the communication terminal 10A having a valid usage authorization, the terminal management unit 53 changes the operating state that is stored the terminal management table 603 in association with the communication ID "01aa" of the communication terminal 10A "Online (available for communication)". At this time, the terminal management unit 53 updates the reception date and time, and updates the IP address of the communication terminal 10 as needed (step S24). As a result, in the terminal management table 603, the operating state "Online (available for communication)", the reception date and time "20xx.4.10, 13: 40", and the IP address "1.2.1.3" of the communication terminal 10A are stored in association with the communication ID "01aa" of the communication terminal 10A.

The data exchange unit 51 of the communication management system 50 transmits authentication result information indicating an authentication result obtained by the terminal authentication unit 52 to the communication terminal 10A, which is a request sender terminal that has sent the above-mentioned login request information, via the communication network 2 (S25). In the following, the description is given of a case where in step S23, the terminal authentication unit 52 determines that the communication terminal 10A is a communication terminal that has a valid usage authorization.

The terminal extraction unit 54 of the communication management system 50 searches the destination list management table 701 by using the communication ID "01aa" of the request sender terminal (the communication terminal 10A) from which the login request is received as a search key. By this searching, the terminal management unit 53 extracts communication IDs of counterpart terminal candidates that can communicate with the request sender terminal (communication terminal 10A) (step S26). For example, "01b1", "01b2", and "01b3" are extracted as the communication IDs of the counterpart terminals associated with the communication ID "01aa" of the request sender terminal (the communication terminal 10A).

Next, the terminal extraction unit 54 searches the terminal management table 603 by using the extracted communication IDs ("01b1", "01b2", "01b3") of the counterpart terminal candidates as search keys. By this searching, the terminal extraction unit 54 reads out the operating state associated with each of the communication IDs ("01b1", "01b2", "01b3") to acquire the operation state of each of the communication terminals identified by these communication IDs (step S27).

Figure 16:
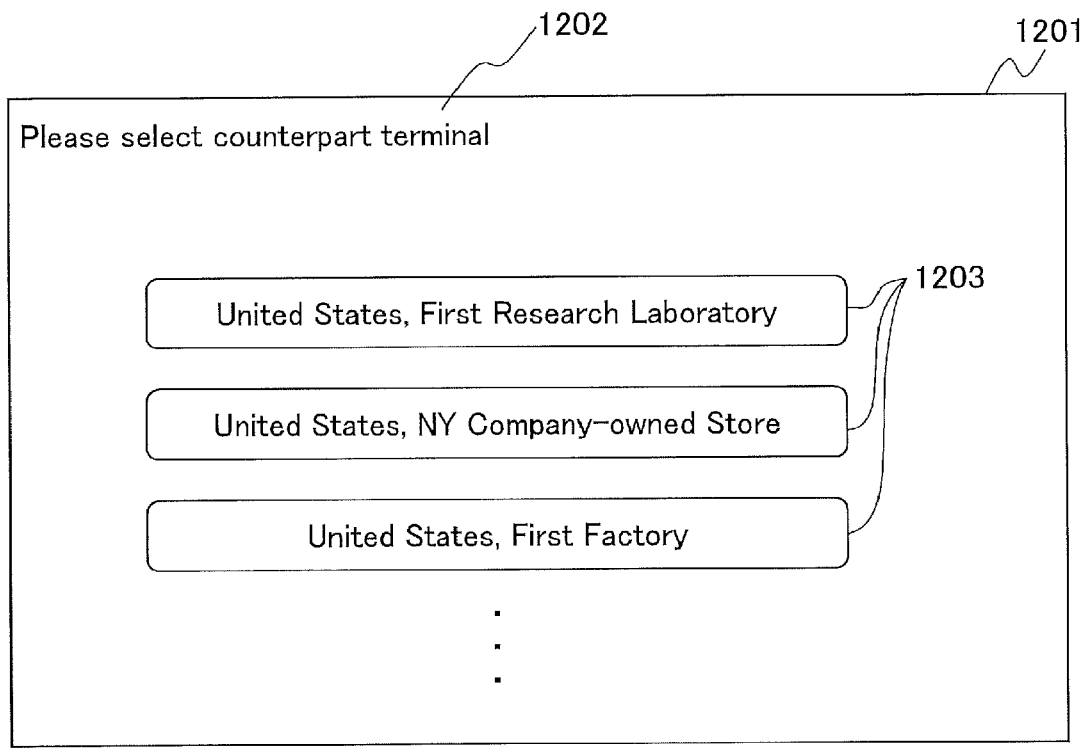
FIG. 16 is an illustration of an example of a destination selection screen displayed on the communication terminal, according to an embodiment of the present disclosure.

Next, the data exchange unit 51 transmits, to the request sender terminal (communication terminal 10A), counterpart state information including the communication IDs ("01b1", "01b2", "01b3") of the counterpart terminal candidates and the operating state of each of the communication terminals identified by these communication IDs (step S28). This allows the request sender terminal (communication terminal 10A) recognize the current operating state of each of the communication terminals identified by the communication IDs ("01b1", "01b2", and "01b3"), which are candidates for the counterpart terminal with which the request sender terminal (the communication terminal 10A) is to communicate. The communication terminal 10A displays a destination selection screen as illustrated in FIG. 16.

Further, the terminal extraction unit 54 of the communication management system 50 searches the destination list management table 701 by using the communication ID "01aa" of the request sender terminal (the communication terminal 10A) from which the login request is received as a search key. By this searching, the terminal extraction unit 54 extracts the communication ID(s) of one or more other request sender terminals that have registered the communication ID "01aa" of the request sender terminal (the communication terminal 10A) as a counterpart terminal candidate (step S29). In case of the destination list management table 701 of Table 3, the extracted communication IDs of the other request sender terminals are "01b1", "01b2" and "01b3".

Next, the terminal management unit 53 of the communication management system 50 searches the terminal management table 603 by using the communication ID "01aa" of the request sender terminal (the communication terminal 10A) from which the login request is received as a search key. By this searching, the terminal management unit 53 acquires the operating state of the request sender terminal (the communication terminal 10A) from which the login request is received (step S30).

Next, the terminal management unit 53 of the communication management system 50 selects, from among the communication IDs ("01b1", "01b2", "01b3") extracted in step S29, one or more communication IDs ("01b1", "01b2", "01b3") associated with the operating state of "Online (available for communication)" in the terminal management table 603.

Further, the data exchange unit 51 transmits counterpart state information including the communication ID "01aa" of the request sender terminal (communication terminal 10A) and the operating state "Online (available for communication)" to the communication terminal 10B1 corresponding to the extracted communication IDs ("01b1", "01b2", "01b3") (step S31).

On the other hand, the other communication terminal 10B1 also performs the same processes as those in steps S22 to S32, in response to an operation of turning on the power, for example. For example, an administrator of the mobile apparatus 20, for example, turns on the communication terminal 10B1.

<Destination Selection Screen>

FIG. 16 is an illustration of an example of the destination selection screen displayed on the communication terminal 10A. On the destination selection screen 1201 illustrated in FIG. 16, a message 1202 for guiding the operator to select a desired communication terminal 10 as a counterpart and a plurality of buttons 1203 corresponding to the plurality of communication terminals 10 as counterpart terminals. The operator of the communication terminal 10A selects one of the displayed plurality of buttons 1203, to select a counterpart terminal to which a request for participation in a session is to be sent. In other words, the operator selects the mobile apparatus 20 to be controlled. As illustrated in FIG. 16, since the operator can select a plurality of communication terminals 10B, the operator can recognize the situation of different sites from the same place.

<Communication Processes>

Figure 17A:
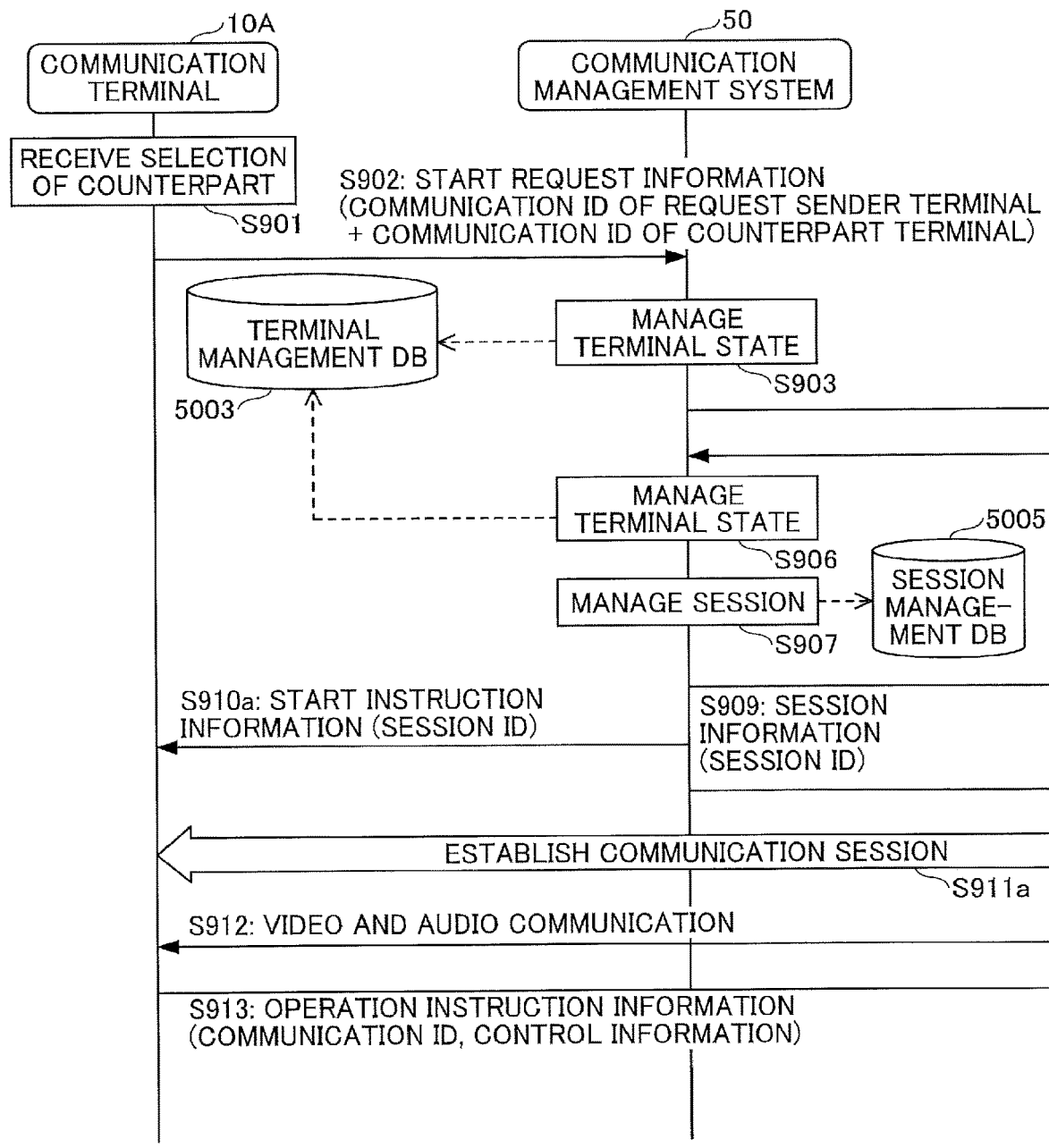
FIG. 17A and FIG. 17B are a sequence diagram illustrating an example of communication processes performed by the communication system, according to an embodiment of the present disclosure.
Figure 17B:
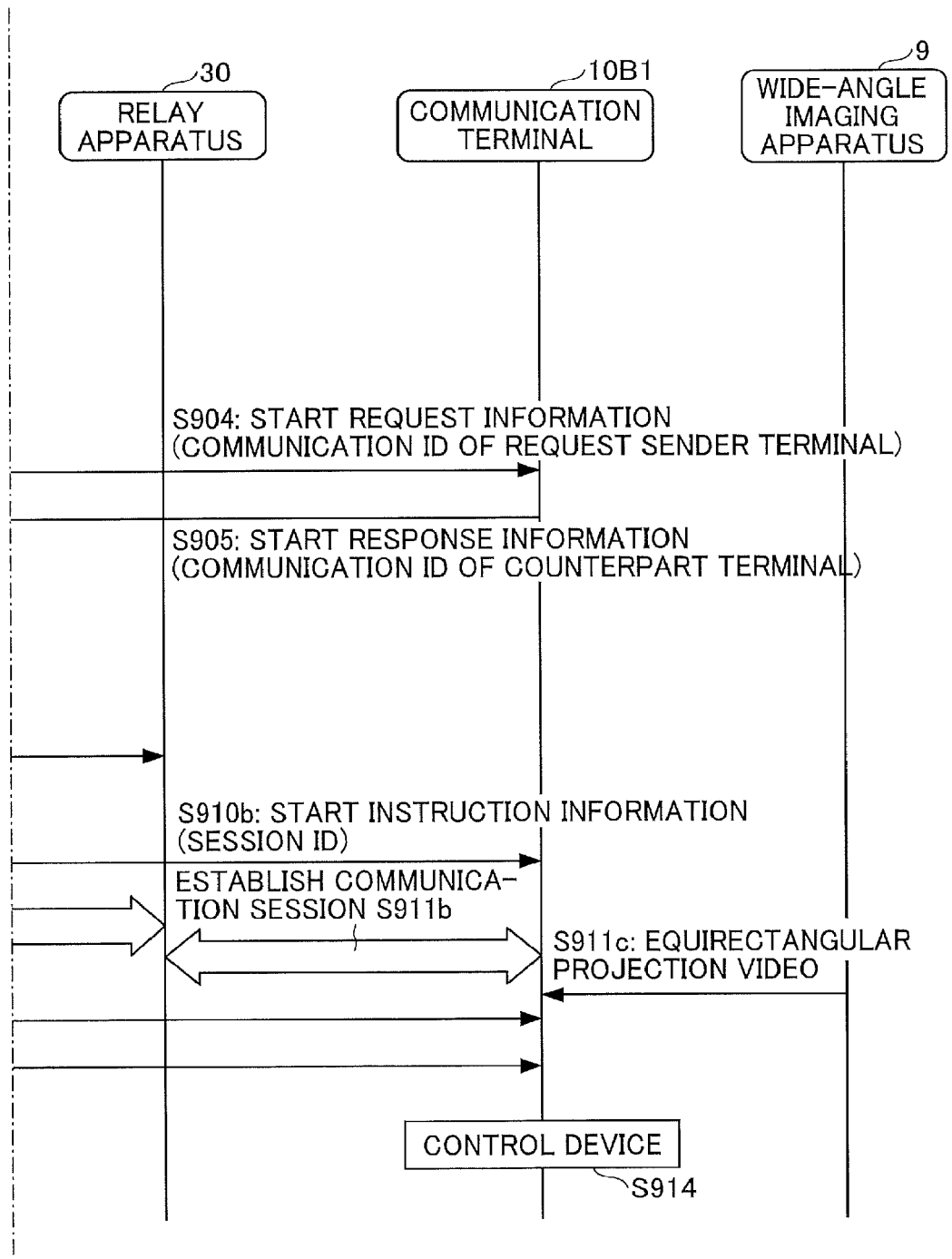

FIG. 17A and FIG. 17B are a sequence diagram illustrating an example of communication processes performed by the communication system 1. In the present embodiment, a description is given of an example of a communication management for starting communication between the communication terminal 10A and the communication terminal 10B1, which is a device control terminal configured to control the mobile apparatus 20.

In step S901, the operation input receiving unit 12 of the communication terminal 10A receives a selection operation of a counterpart terminal (the communication terminal 10B1) by the operator of the communication terminal 10A.

The data exchange unit 11 of the communication terminal 10A transmits start request information for requesting the start of a session to the communication management system 50 (step S902). This start request information includes, for example, a communication ID of a request sender terminal (i.e., the communication ID of the communication terminal 10A as a request sender terminal), and a communication ID of a counterpart terminal (i.e., the communication ID of the communication terminal 10B1 as the counterpart terminal). The start request information further includes information such as an IP address (request source IP address) of the communication terminal 10A.

In step S903, in response to receiving the start request information from the communication terminal 10A, the terminal management unit 53 of the communication management system 50 updates the terminal management DB 5003 based on the communication ID "01aa" of the request sender terminal (the communication terminal 10A) included in the start request information. For example, the terminal management unit 53 changes information of the operating state corresponding to the communication ID "01aa" of the communication terminal 10A to "Online (communicating)" and updates information of the reception date and time.

In step S904, the session management unit 55 of the communication management system 50 transmits start request information for requesting the start of a session to the communication terminal 10B1, which is a counterpart terminal. This start request information includes, for example, the communication ID of the request sender terminal (i.e., the communication terminal 10A as a request sender terminal).

In step S905, in response to receiving the start request information from the communication management system 50, the communication terminal 10B1 transmits start response information to the communication management system 50. This start response information includes, for example, the communication ID of the counterpart terminal (e.g., the communication terminal 10B1). In the present embodiment, the start response information is transmitted without any operation on the communication terminal 10B1 side. In another example, the communication terminal 10B1 transmits the start response information in response to an operation by the administrator.

In step S906, in response to receiving the start response information from the communication terminal 10B1, the terminal management unit 53 of the communication management system 50 updates the terminal management DB 5003 based on the communication ID "01b1" of the communication terminal 10B1 included in the start response information. For example, the terminal management unit 53 changes information of the operating state corresponding to the communication ID "01b1" of the communication terminal 10B1 to "Online (communicating)", and updates information of the reception date and time.

In step S907, the session management unit 55 of the communication management system 50 generates a session ID, which is identification information for identifying a session. Further, the session management unit 55 stores, in the session management DB 5005, the generated session ID in association with the communication ID of the request sender terminal (the communication ID of the communication terminal 10A) and the communication ID of the counterpart terminal (the communication ID of the communication terminal 10B1).

In step S909, the session management unit 55 of the communication management system 50 transmits session information to the relay apparatus 30. This session information includes, for example, information such as the session ID generated in step S907. The relay apparatus 30 can acquire the session information from the session management DB 5005 based on the session ID.

In step S910a, the session management unit 55 of the communication management system 50 transmits start instruction information for instructing the communication terminal 10A to start a session. In substantially the same manner, in step S910b, the session management unit 55 of the communication management system 50 transmits start instruction information for instructing the communication terminal 10B1 to start a session. The start instruction information includes the session ID, and the communication terminal 10 can acquire session information from the session management DB 5005 based on the session ID.

In step S911a, the communication terminal 10A establishes a session with the relay apparatus 30 based on the received start instruction information. In substantially the same manner, in step 911b, the communication terminal 10B1 establishes a session with the relay apparatus 30 based on the received start instruction information. Thus, the communication terminal 10A and the communication terminal 10B1 can participate in the same session.

In step S911c, the wide-angle image transmitting unit 31 of the wide-angle image capturing apparatus 9 transmits an equirectangular projection video to the communication terminal 10B1. For example, when the communication terminal 10B1 establishes a session, the communication terminal 10B1 instructs the wide-angle image capturing apparatus 9 start imaging and transmission of an equirectangular projection video. In another example, the wide-angle image capturing apparatus 9 can continuously transmit an equirectangular projection video to the communication terminal 10B1 during a time period when the power of the wide-angle image capturing apparatus 9 is on. In still another example, an equirectangular projection video can be transmitted before establishment of a session.

The communication terminal 10A and the communication terminal 10B1 participate in a session identified by the same session ID, and then exchange content data such as image data and audio data with each other, to perform a videoconference, for example (S912). This image data includes an equirectangular projection video, a front-side video, and a rear-side video.

Further, the communication terminal 10A can exchange information relating to an operation of a device (e.g., the mobile apparatus 20) with the communication terminal 10B1 by using the established session.

In another example, the information relating to the operation of the device can be exchanged by using a control session via the communication management system 50, instead of by using the session. In still another example, the information relating the operation of the device can be exchanged between the communication terminal 10A and the communication terminal 10B1 via the communication network 2 or the like.

In the present embodiment, the following description is provided on the assumption that the communication terminal 10A exchanges the information relating to the operation of the device (e.g., the mobile apparatus 20) with the communication terminal 10B1 by using the established session.

In step S913, in response to an input by the operator of the communication terminal 10A on a screen that accepts instructions for operating the device, the communication terminal 10A transmits operation instruction information corresponding to the input is transmitted by using the session. This operation instruction information includes, for example, the communication ID of the communication terminal 10A and an operation instruction corresponding to the operation content by the operator.

In step S914, the device control unit 19c of the communication terminal 10B1 controls the mobile apparatus 20 via the inter-device communication unit 19d based on the operation instruction included in the operation instruction information transmitted from the communication terminal 10A.

<Pattern 1>

Figure 18:
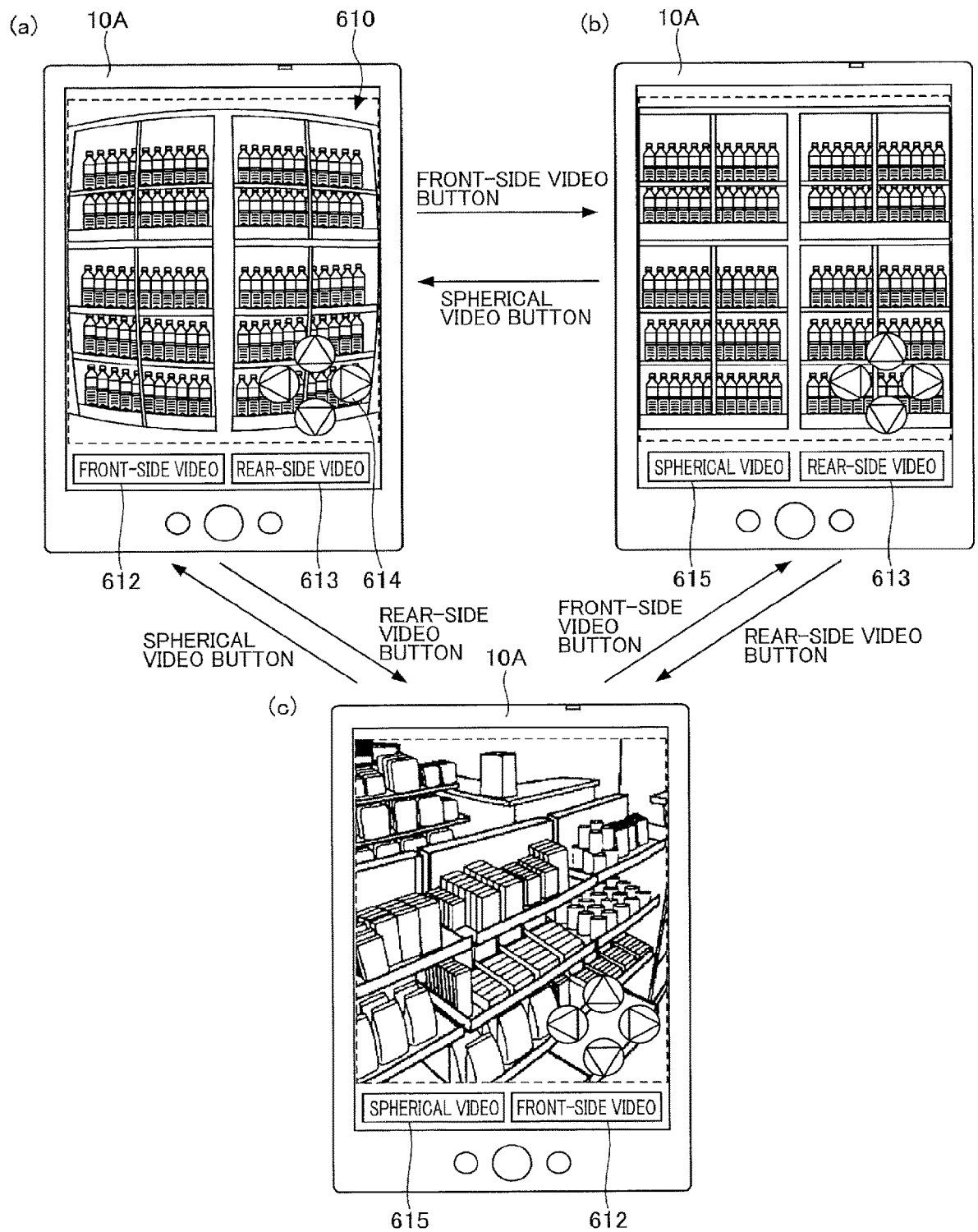
FIG. 18 is an illustration of an example of a video display screen displayed on the display by the communication terminal in Pattern 1, according to an embodiment of the present disclosure.

A description is now given of examples of the video layout patterns 1 to 3. FIG. 18 is an illustration of an example of a video display screen 610 displayed on the display 109 by the communication terminal 10A in Pattern 1. The video display screen 610 includes a video display area 611, a front-side video button 612, a rear-side video button 613, and the mobile apparatus operation button 614. In the video display area 611 of an illustration (a) of FIG. 18, a spherical video is displayed. The display control unit 16 of the communication terminal 10A maps the equirectangular projection video transmitted from the communication terminal 10B to the surface of a solid sphere to generate the spherical video (see FIG. 10A and FIG. 10B).

The operator can rotate the spherical video horizontally and vertically with a finger, a mouse or the like. Further, the operator can reduce the spherical video by pinching in on the spherical video with a finger, and can enlarge the spherical video by pinching out. Thus, the communication terminal 10A can display a desired predetermined-area image Q in the video display area 611 according to an operator's operation.

The front-side video button 612 is a button for switching a video to be displayed in the video display area 611 to a front-side video. The rear-side video button 613 is a button for switching a video to be displayed in the video display area 611 to a rear-side video. The mobile apparatus operation button 614 has four buttons. The four buttons correspond to buttons for controlling the mobile apparatus 20 to move back, forth, right and left, respectively. Since the mobile apparatus operation button 614 is displayed as being superimposed on the spherical video, the display area is larger than a display area of a case where the mobile apparatus operation button 614 is displayed independently. This makes the display area suitable for viewing.

An illustration (b) of FIG. 18 is an illustration of the video display screen 610 in which a front-side video is displayed in the video display area 611 in response to pressing of the front-side video button 612. Since the front-side video button 612 is pressed, the front-side video is displayed in the video display area 611. In addition, the spherical video button 615 is displayed instead of the front-side video button 612. The spherical video button 615 is a button for switching a video to be displayed in the video display area 611 to a spherical video.

Since the mobile apparatus operation button 614 is displayed as being superimposed on the front-side video or the rear-side video, the display area is larger than a display area of a case where the mobile apparatus operation button 614 is displayed independently. This makes the display area suitable for viewing.

An illustration (c) of FIG. 18 is an illustration of the video display screen 610 in which a rear-side video is displayed in the video display area 611 in response to pressing of the rear-side video button 613. The spherical video button 615 and the front-side video button 612 are displayed instead of the rear-side video button 613.

As described above, by pressing the front-side video button 612, the rear-side video button 613, and the spherical video button 615, a video to be displayed in the video display area 611 is switched from one to another.

Figure 19:
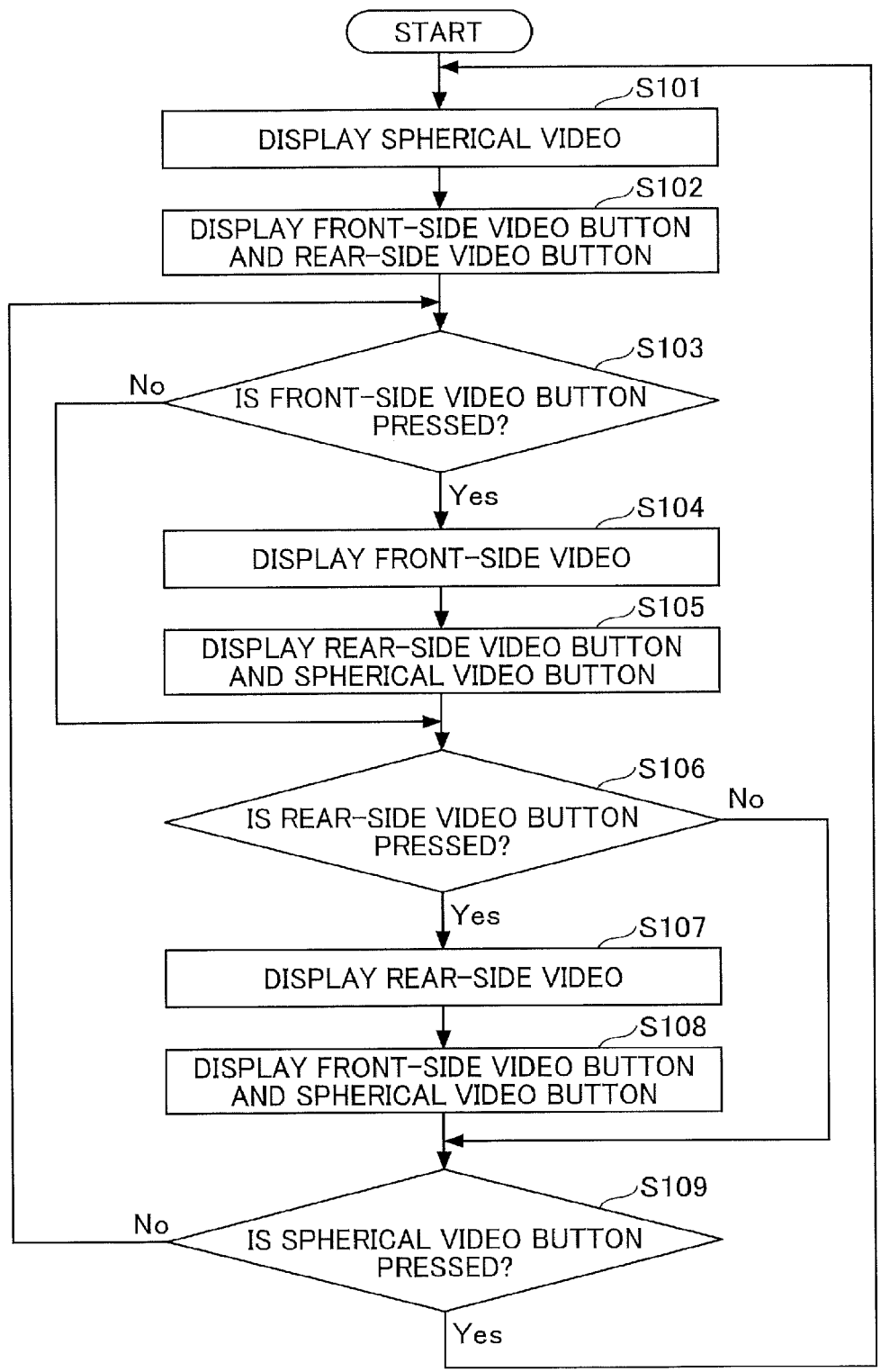
FIG. 19 is a flowchart illustrating an example of an operation of switching a video to be displayed in a video layout example of Pattern 1, according to an embodiment of the present disclosure.

FIG. 19 is a flowchart illustrating an example of an operation of switching a video to be displayed in the video layout example of Pattern 1. The operation illustrated in FIG. 19 starts when the communication terminal 10A receives at least one of a spherical video, a front-side video, and a rear-side video.

First, the display control unit 16 controls the display 109 to display a spherical video (S101). In this case, the mobile apparatus operation button 614 is displayed as being superimposed on the spherical video. When the spherical video is displayed, the operation input receiving unit 12 receives an operation for rotation, enlargement, and/or reduction. The display control unit 16 displays an image of the predetermined area T according to the received operation in the video display area 611.

Displaying the spherical video first as described above is just one example. In another example, a front-side video or a rear-side video is displayed first. In still another example, any one of the spherical video, the front-side video and the rear-side video is displayed in an order that the communication terminal 10A receives these videos.

The display control unit 16 controls the display 109 to display the front-side video button 612 and the rear-side video button 613 (S102).

The operation input receiving unit 12 determines whether the front-side video button 612 is pressed (S103). When the operation input receiving unit 12 determines that the front-side video button 612 is not pressed (S103: NO), the operation proceeds to step S106.

When the operation input receiving unit 12 determines that the front-side video button 612 is pressed (S103: YES), the display control unit 16 displays a front-side video (S104). The display control unit 16 controls the display 109 to display the rear-side video button 613 and the spherical video button 615 (S105).

The operation input receiving unit 12 determines whether the rear-side video button 613 is pressed (S106). When the operation input receiving unit 12 determines that the rear-side video button 613 is not pressed (S106: NO), the operation proceeds to step S109.

When the operation input receiving unit 12 determines that the rear-side video button 613 is pressed (S106: YES), the display control unit 16 displays a rear-side video (S107). The display control unit 16 controls the display 109 to display the front-side video button 612 and the spherical video button 615 (S108).

The operation input receiving unit 12 determines whether the spherical video button 615 is pressed (S109). When the operation input receiving unit 12 determines that the spherical video button 615 is pressed (S109: YES), the operation proceeds to step S101. When the operation input receiving unit 12 determines that the spherical video button 615 is not pressed (S109: NO), the operation proceeds to step S103.

As described above, the communication terminal 10A can video in Pattern 1 in response to receiving the pressing of the front-side video button 612, the rear-side video button 613, or the spherical video button 615.

As described above, in the video layout example of Pattern 1, a video to be displayed on one display 109 is switched from among the spherical video, the front-side video and the rear-side video. This secures the sizes of the spherical video and the front-side video (rear-side video). Such layout is suitable for viewing by the operator. In a state where the spherical video is displayed, the operator can check 360-degree surroundings around the wide-angle image capturing apparatus 9 (i.e. the communication terminal 10B) by rotating the spherical video. In addition, since the front-side video has a high resolution, displaying the front-side video is suitable when the operator wants to read characters on a signboard or the like or when the operator wants to check the structure of an object.

<Pattern 2>

Figure 20:
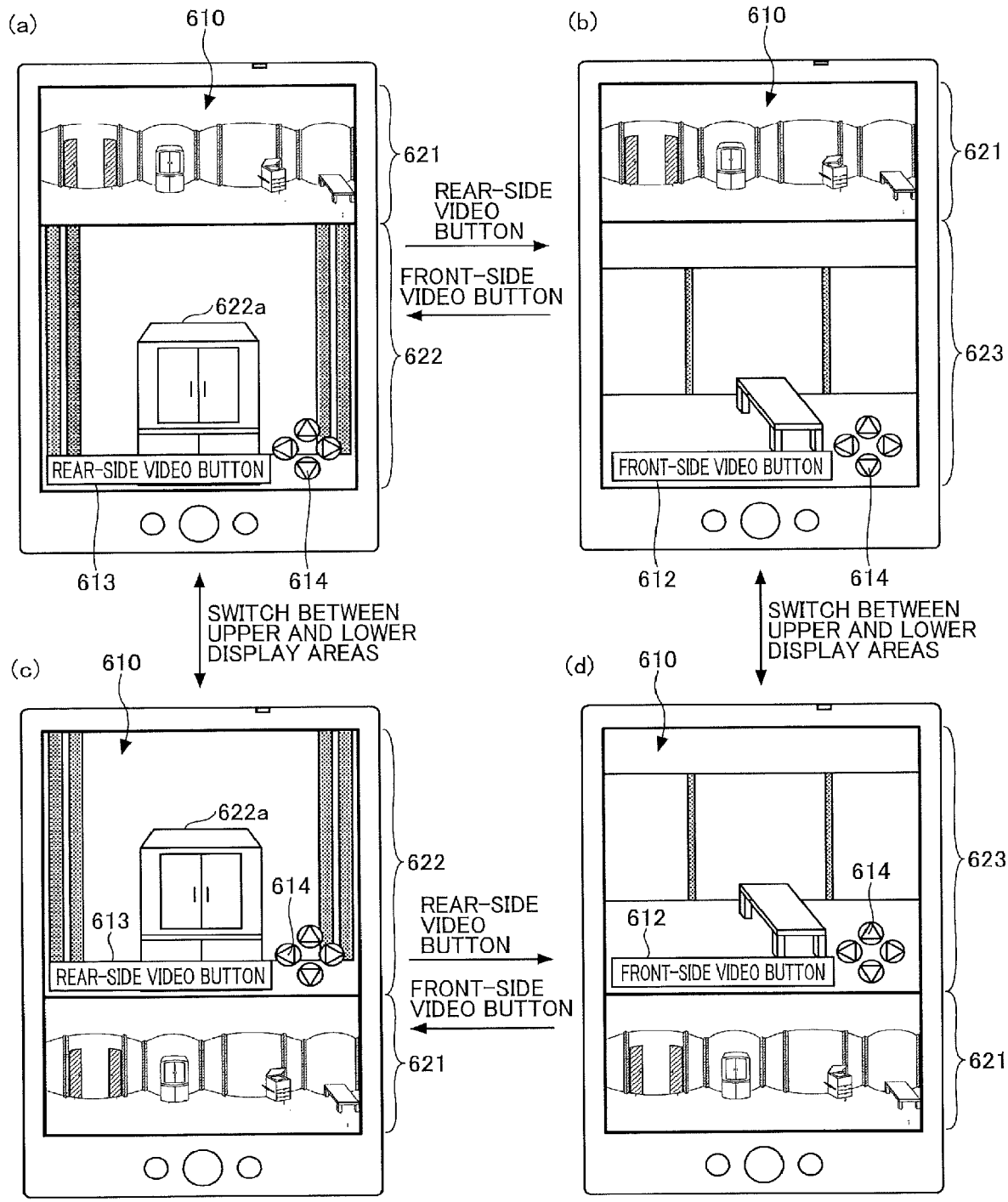
FIG. 20 is an illustration of an example of the video display screen displayed on the display by the communication terminal in Pattern 2, according to an embodiment of the present disclosure.

FIG. 20 is an illustration of an example of a video display screen 610 displayed on the display 109 by the communication terminal 10A in Pattern 2. The video display screen 610 in the illustration (a) of FIG. 20 includes an entire view area 621, a front-side video area 622, and the mobile apparatus operation button 614. In the entire view area 621, an equirectangular projection video is displayed. For example, the equirectangular projection video in the illustration (a) of FIG. 20 is video obtained by imaging a room in a model house, and the video includes four walls and some furniture. As illustrated, in the equirectangular projection video, objects in 360-degree surroundings is represented on a plane.

In the front-side video area 622, a front-side video is displayed. In the front-side video in the illustration (a) of FIG. 20, a shelf 622a is displayed. The equirectangular projection video is greatly distorted compared to the front-side video, which has little distortion and a narrower angle of view than the equirectangular projection video. Further, the front-side video is displayed larger than the equirectangular projection video. Since the resolution of the front-side video is higher than the resolution of the equirectangular projection video, the operator is likely to obtain detailed information from the front-side video. For example, the front-side video is suitable when the operator wants to read characters on a signboard or the like or when the operator wants to check the structure of a product. Furthermore, although the equirectangular projection video distorted and displayed smaller than the front-side video, the equirectangular projection video is always displayed on the video display screen 610. This allows the operator to recognize the situation around the mobile apparatus 20.

Since the mobile apparatus operation button 614 is displayed as being superimposed on the front-side video, the display area is larger than a display area of a case where the mobile apparatus operation button 614 is displayed independently. This makes the display area suitable for viewing.

The front-side video area 622 includes the rear-side video button 613 that allows the user to switch the front-side video to a rear-side video.

An illustration (b) of FIG. 20 is an illustration of an example of the video display screen 610 displayed when the rear-side video button 613 is pressed. The video display screen 610 in the illustration (b) of FIG. 20 has a rear-side video area 623 instead of the front-side video area 622. In the rear-side video area 623, a rear-side video is displayed. The rear-side video area 623 includes the front-side video button 612 that allows the user to switch the rear-side video to the front-side video.

In addition, when the videos are displayed as in the illustrations (a) and (b) of FIG. 20, the operate can perform operation for arranging the front-side video or the rear-side video on the upper side and the equirectangular projection video on the lower side. For example, when the user swipes (or flick) the entire view area 621 downward, or swipes (or flick) the front-side video area 622 or the rear-side video area 623 upward, the communication terminal 10A displays the video display screen 610 as in the illustrations (c) and (d) of FIG. 20.

In the illustration (c) of FIG. 20, the front-side video is displayed on the upper side, and the equirectangular projection video is displayed on the lower side. In the illustration (d) of FIG. 20, the rear-side video is displayed on the upper side, and the equirectangular projection video is displayed on the lower side. As described, the user can control the communication terminal 10A to display the front-side video, the rear-side video, and the equirectangular projection video in the user's desired arrangement.

Figure 21:
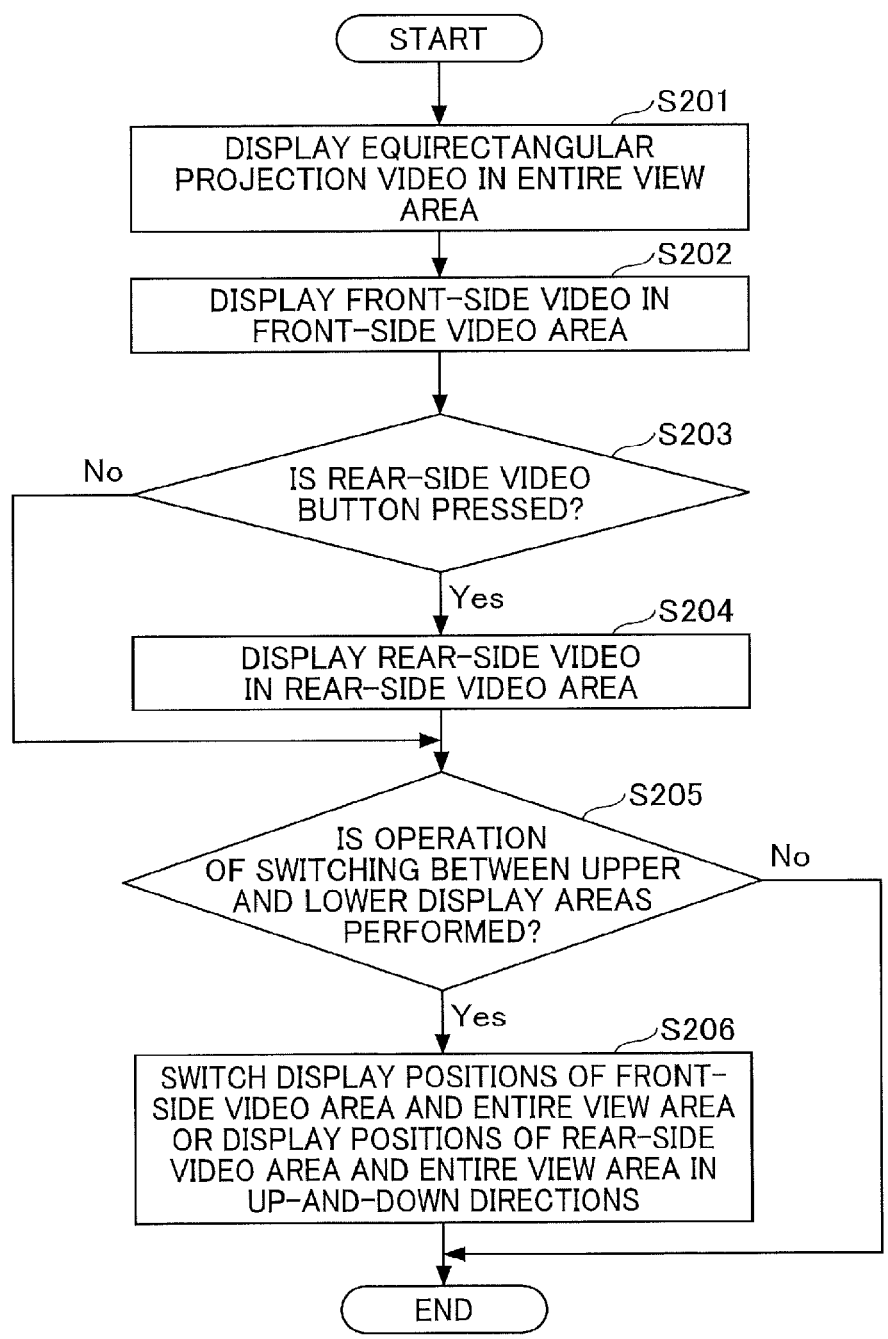
FIG. 21 is a flowchart illustrating an example of an operation of displaying videos in a video layout example of Pattern 2, according to an embodiment of the present disclosure.

FIG. 21 is a flowchart illustrating an example of an operation of displaying videos in the video layout example of Pattern 2. The operation illustrated in FIG. 21 starts when the communication terminal 10A receives at least one of a spherical video, a front-side video, and a rear-side video.

The display control unit 16 displays an equirectangular projection video in the entire view area 621 (S201).

The display control unit 16 displays a front-side video in the front-side video area 622 (S202). In this case, the mobile apparatus operation button 614 is displayed as being superimposed on the spherical video. In another example, the rear-side video is displayed first. In still another example, the equirectangular video, the front-side video and the rear-side video is displayed in an order that the communication terminal 10A receives these videos.

Next, the operation input receiving unit 12 determines whether the rear-side video button 613 is pressed (S203). When the operation input receiving unit 12 determines that the rear-side video button 613 is pressed (S203: YES), the display control unit 16 displays a rear-side video in the rear-side video area 623 (S204).

Next, the operation input receiving unit 12 determines whether an up-and-down switching operation such as swiping is input (S205). When the operation input receiving unit 12 determines the up-and-down switching operation is input (S205: YES), the display control unit 16 switches the display positions of the front-side video area 622 and the entire view area 621 or the display positions of the rear-side video area 623 and the entire view area 621 in an up-and-down directions (S206).

Thus, the equirectangular projection video and the front-side video, or the equirectangular projection video and the rear-side video are displayed together on one video display screen 610.

Figure 22:
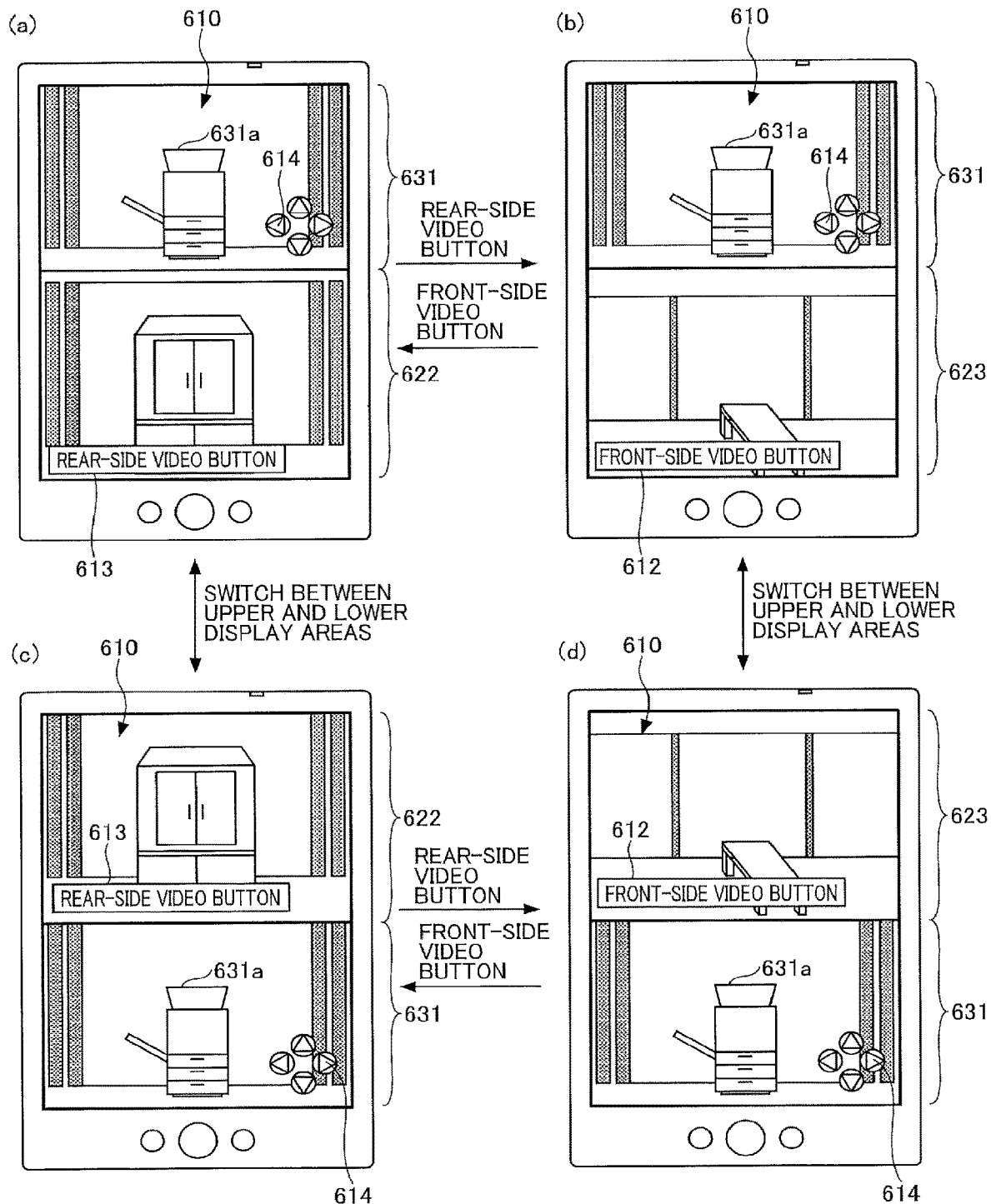
FIG. 22 is an illustration of an example of the video display screen displayed on the display by the communication terminal in another example display of Pattern 2, according to an embodiment of the present disclosure.

A description is now given of another display example of Pattern 2 with reference to FIG. 22. FIG. 22 is an illustration of an example of the video display screen 610 displayed on the display 109 by the communication terminal 10A in Pattern 2. The video display screen 610 in an illustration (a) of FIG. 22 includes a spherical video area 631, the front-side video area 622, and the mobile apparatus operation button 614. In the spherical video area 631, a spherical video is displayed. The display control unit 16 of the communication terminal 10A maps an equirectangular projection video transmitted from the communication terminal 10B to the surface of a solid sphere to generate the spherical video (see FIG. 10A and FIG. 10B). In substantially the same manner as described with reference with the illustrations (b) to (d) of FIG. 20, the illustrations (b) to (d) of FIG. 22 represent states in which the front-side video and the rear-side video are switched, the display positions of the spherical video and the front-side video are switched, or the display positions of the spherical video and the rear-side video are switched.

Although in the illustration (a) of FIG. 22, an image of a copier 631a is included in the spherical video area 631, this is for the sake of explanatory convenience. The communication terminal 10A can display a desired predetermined-area image Q in the spherical video area 631 according to an operator's operation. The same description of the front-side video area 622 provided above with reference to the illustration (a) of FIG. 20 applied to the front-side video area 622 illustrated in FIG. 22. In another example, the mobile apparatus operation button 614 can be displayed in the spherical video area 631.

In the illustration (a) of FIG. 22, the spherical video area 631 and the front-side video area 622 have substantially the same size. An image (video) of a desired direction that the operator wants to view can be displayed in a large size in the spherical video area 631. Although the front-side video area 622 is smaller compared to that of the illustration (a) of FIG. 20, since the front-side video has a high resolution, the operator can obtain detailed information from the front-side video. Accordingly, since the spherical video area 631 and the front-side video area 622 have the same size, the advantages of a spherical video and a front-side video can be provided.

Figure 23:
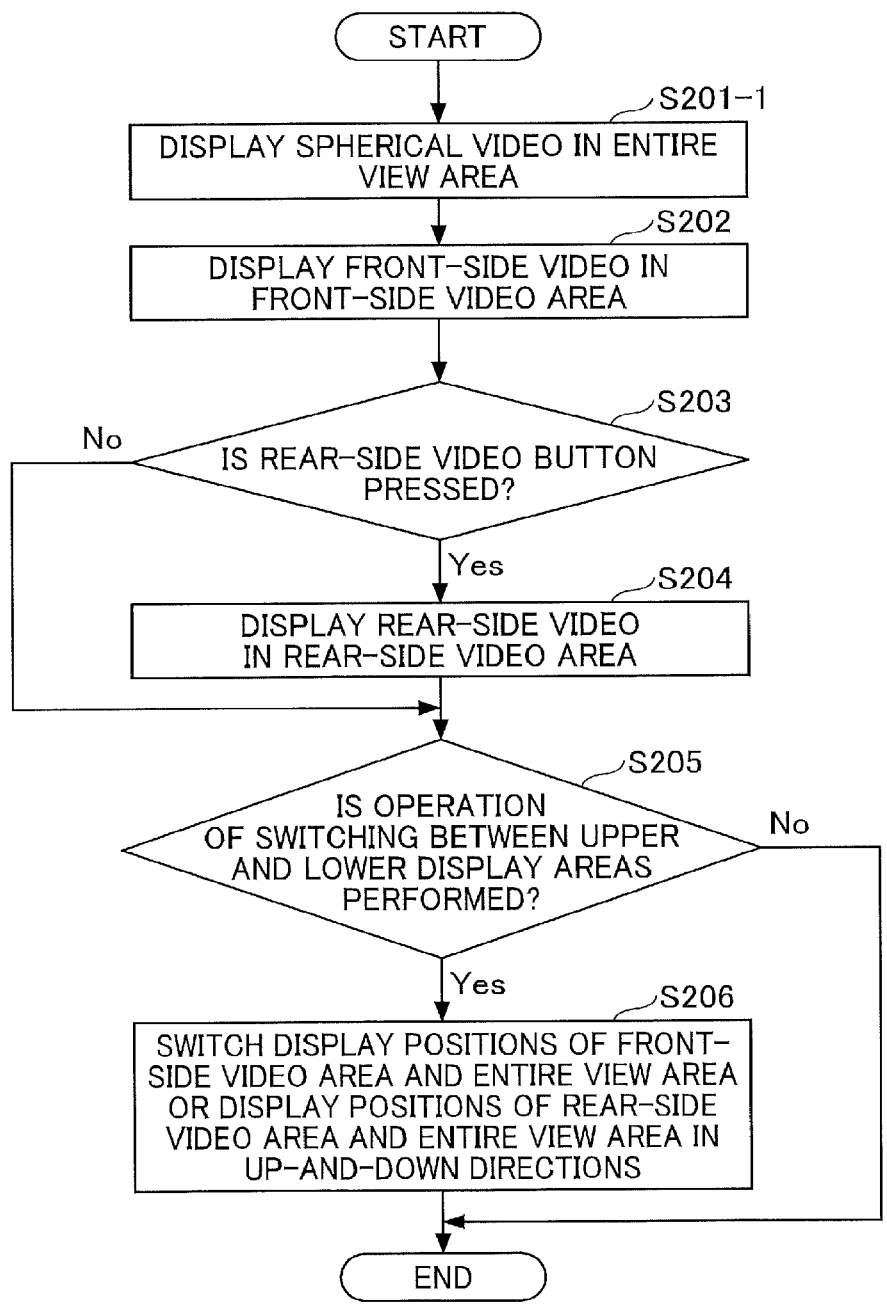
FIG. 23 is a flowchart illustrating an example of an operation of displaying videos in the another display example of Pattern 2 illustrated in FIG. 22, according to an embodiment of the present disclosure.

FIG. 23 is a flowchart illustrating an example of an operation of displaying videos in the another display example of Pattern 2 illustrated in FIG. 22. The processes in the operation illustrated in FIG. 23 are performed in substantially the same manner as described above with reference to FIG. 21, except that an equirectangular projection video is replaced with a spherical video. With the operation of FIG. 23, a spherical video and a front-side video, or a spherical video and a rear-side video are displayed together on one video display screen 610.

Although in Pattern 1 and Pattern 2, the orientation of the screen of the communication terminal 10A is portrait (vertical), this is just one example. Alternatively, the orientation of the screen of the communication terminal 10A can be landscape (horizontal). In this case, it is preferable to maintain the aspect ratio of the videos. Alternatively, the videos can be enlarged or reduced in the vertical or horizontal direction as the aspect ratio being changed.

<Pattern 3>

Figure 24:
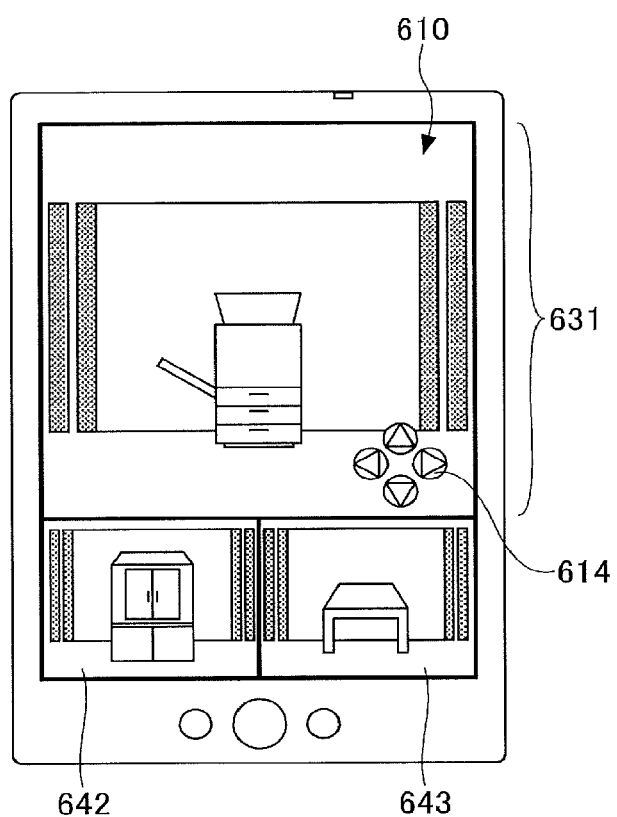
FIG. 24 is an illustration of an example of the video display screen displayed on the display by the communication terminal in Pattern 3, according to an embodiment of the present disclosure.

FIG. 24 is an illustration of an example of the video display screen 610 displayed on the display 109 by the communication terminal 10A in Pattern 3. The video display screen 610 illustrated in FIG. 24 includes the spherical video area 631, a sub front-side video area 642, a sub rear-side video area 643, and the mobile apparatus operation button 614. In the spherical video area 631, a spherical video is displayed. In sub front-side video area 642, a front-side video is displayed. In the sub rear-side video area 643, a rear-side video is displayed. An object included in the front-side video displayed in the sub front-side video area 642 is present in a direction that is opposite by 180 degrees viewed from the mobile apparatus 20 to a direction in which another object included in the back video displayed in the sub rear-side video area 643.

In the video display screen 610 of FIG. 24, the spherical video area 631 is larger than any of the sub front-side video area 642 and the sub rear-side video area 643. Therefore, the spherical video is a main video, and each of the front-side video and the rear-side video is a sub video. An image (video) of a desired direction that the operator wants to view can be displayed in a large size in the spherical video area 631. In addition, since the front-side video and the rear-side video are always displayed, the operator can always recognize the traveling direction of the mobile apparatus 20. Further, the operator can always recognize the situation behind the travelling direction.

Since the mobile apparatus operation button 614 as being superimposed on the spherical video, the display area is larger than a display area of a case where the mobile apparatus operation button 614 is displayed independently. This makes the display area suitable for viewing.

Although in the above description, the spherical video area 631 is larger than any of the sub front-side video area 642 and the sub rear-side video area 643, this is just one example. In another example, the front-side video is displayed larger than the spherical video and the rear-side video. In still another example, the rear-side video is displayed larger than the spherical video and the front-side video. Further, it is preferable that the operator can configure a desired setting as to which video is to be displayed in each of the three display areas (the spherical video area 631, the sub front-side video area 642, and the sub rear-side video area 643).

Figure 25:
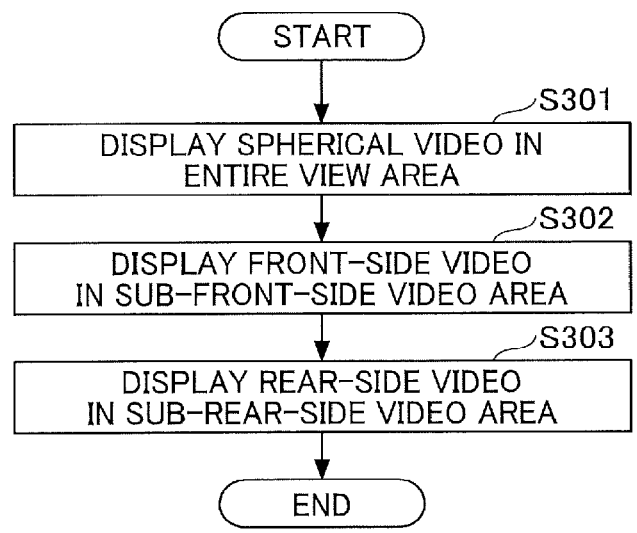
FIG. 25 is a flowchart illustrating an example of an operation of displaying videos in the video layout example of Pattern 3, according to an embodiment of the present disclosure.

FIG. 25 is a flowchart illustrating an example of an operation of displaying videos in the video layout example of Pattern 3. The operation illustrated in FIG. 25 starts when the communication terminal 10A receives at least one of a spherical video, a front-side video, and a rear-side video.

The display control unit 16 displays a spherical video in the spherical video area 631 (S301). In this case, the mobile apparatus operation button 614 is displayed as being superimposed on the spherical video.

The display control unit 16 displays a front-side video in the sub front-side video area 642 (S302). The display control unit 16 displays a rear-side video in the sub rear-side video area 643 (S303).

Thus, the spherical video, the front-side video and the rear-side video are displayed together on one video display screen 610.

Figure 26:
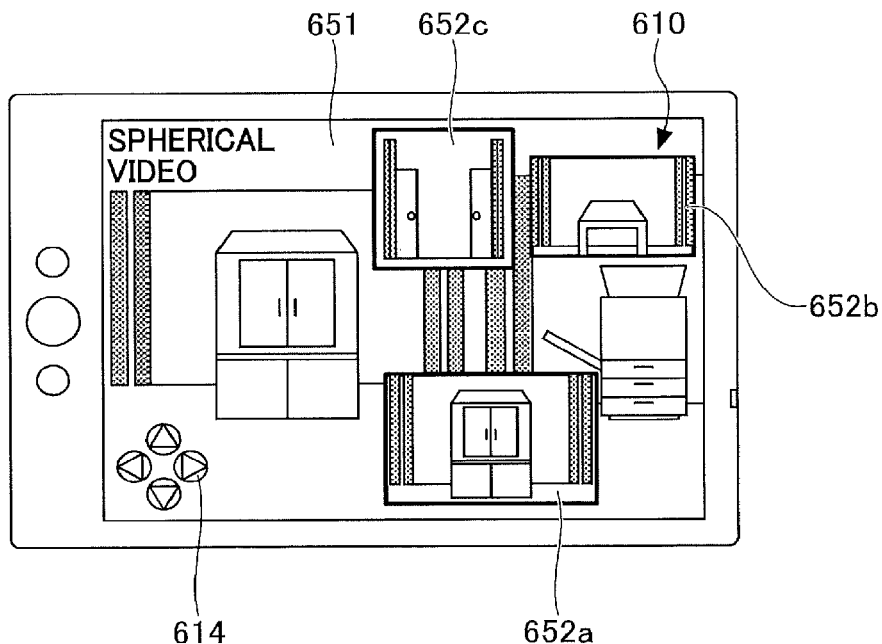
FIG. 26 is an illustration of an example of the video display screen displayed on the display by the communication terminal in another example display of Pattern 3, according to an embodiment of the present disclosure.

A description is now given of another display example of Pattern 3 with reference to FIG. 26. FIG. 26 is an illustration of an example of the video display screen 610 displayed on the display 109 by the communication terminal 10A in Pattern 3. The video display screen 610 illustrated in FIG. 26 includes a main display area 651, one or more various video areas 652 (various video areas 652a to 652c), and the mobile apparatus operation button 614. In the main display area 651, a spherical video is displayed. The display control unit 16 of the communication terminal 10A maps an equirectangular projection video transmitted from the communication terminal 10B to the surface of a solid sphere to generate the spherical video (see FIG. 10A and FIG. 10B).

In the one or more various video areas 652, a desired predetermined-area image Q of the spherical video can be displayed as well as the front-side video and the rear-side video.

The main display area 651 occupies almost the entire area of the display 109, and the one or more various video areas 652 is displayed movably as being superimposed on the main display area 651. In an example illustrated in FIG. 26, three various video areas 652a to 652c are displayed. Each of the various video areas 652 is a window. The operator can change the position and/or the size of one or more of the various video areas 652, delete (hide, close the window) one or more of the various video areas 652, minimize one or more of the various video areas 652, and generate a new window as one of the various video areas 652.

When displaying videos in Pattern 3, the display control unit 16 displays a front-side video and a rear-side video in the various video areas 652. Further, the display control unit 16 displays one or more predetermined-area images Q obtained by duplicating arbitrary one or more partial areas of the spherical video in the various video areas 652. Since the operator can change the predetermined-area image Q, an image of any area of the spherical image can be displayed by default as the predetermined-area image Q in one or more of the various video areas 652. However, since the front-side video and the rear-side video are displayed in the various video areas 652, it is preferable to duplicate an area other than areas corresponding to the front-side video and the rear-side video as the predetermined-area image Q. For example, images of the right side and the left side in the horizontal direction with respect to the front of the mobile apparatus 20 are preferable as the predetermined-area image Q displayed in one or more of the various video areas 652.

The default positions of the various video areas 652 are, for example, the four corners of the main display area 651. The operator can move the various video areas 652 to any desired positions.

In view of the sizes of the main display area 651 and the various video areas 652, a video displayed in the main display area 651 is a main video, and videos displayed in the various video areas 652 are sub videos. The operator can view the spherical video on a large screen, and can cause the communication terminal 10A to display an image of a direction that the operator wants to view in a large size. Further, since the front-side video and the rear-side video are displayed in the various video areas 652, the operator can recognize the situation in the traveling direction of the mobile apparatus 20 and the situation in the opposite direction of the travelling direction. In addition, when the spherical video(s) are displayed in one or more of the various video areas 652, the operator can recognize the situation of a desired direction around the mobile apparatus 20. The spherical video displayed in one of the various video areas 652 is an example of a duplicate video. When the operator performs an operation of generating a new window of the various video areas 652, the operation input receiving unit 12 receives this operation, and the display control unit 16 newly displays the spherical video in the generated window of the various video areas 652.

The operator can perform operation for moving one or more of the various video areas 652 to a desired position such that the one or more of the various video areas 652 blocks the operator's view. In addition, the operator can perform an operation for deleting or minimizing one or more of the various video areas 652. The operation input receiving unit 12 receives such operator's operation, and for example, the display control unit 16 hides or minimizes one or more of the various video areas 652 according to the received operation.

Conventionally, as many image capturing devices as the number of various video areas 652 were needed. In the present embodiment, by the displaying processes as described above, one or more arbitrary predetermined-area images Q obtained by duplicating one or more arbitrary partial area of the spherical video are displayed. This enables to always display videos of many directions at low cost.

Since the mobile apparatus operation button 614 is displayed as being superimposed on the spherical video, the display area is larger than a display area of a case where the mobile apparatus operation button 614 is displayed independently. This makes the display area suitable for viewing.

Figure 27:
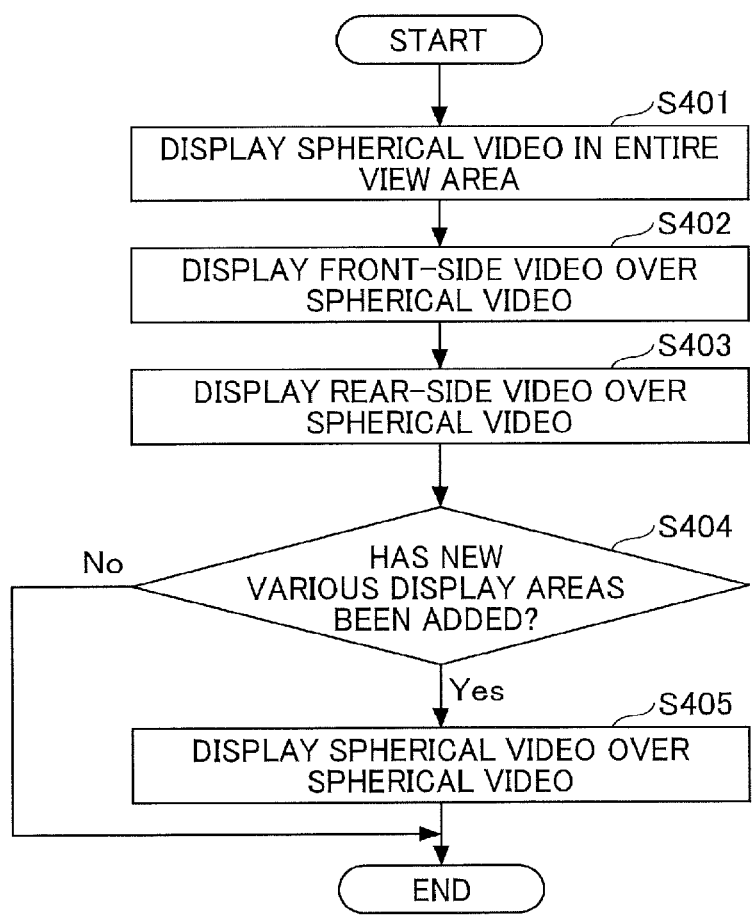
FIG. 27 is a flowchart illustrating an example of an operation of displaying videos in the another display example of Pattern 3 illustrated in FIG. 26, according to an embodiment of the present disclosure.

FIG. 27 is a flowchart illustrating an example of an operation of displaying videos in the video layout example of Pattern 3 described with reference to FIG. 26. The operation illustrated in FIG. 27 starts when the communication terminal 10A receives at least one of a spherical video, a front-side video, and a rear-side video.

The display control unit 16 displays a spherical video in the main display area 651 (S401). In this case, the mobile apparatus operation button 614 is displayed as being superimposed on the spherical video.

The display control unit 16 displays a front-side video as being superimposed on the spherical video (S402). The display control unit 16 displays a rear-side video as being superimposed on the spherical video (S403). For example, the initial positions of the various video areas 652 in which the front-side video and the rear-side video are displayed determined in advance. Alternatively, the initial positions of the various video areas 652 in which the front-side video and the rear-side video are displayed are the positions that were set when the user displayed the video display screen 610 of FIG. 26 last time.

The operation input receiving unit 12 determines whether a new window as one of the various video areas 652 is added (S404). An operation for adding a new window as one of the various video areas 652 can be any operation. For example, the operator performs a long tap or a double tap to cause the communication terminal 10A to display a menu, and selects (presses) a message "Add various video areas" included in the menu. In addition, although the menu can include selection buttons for selecting a front-side video and a rear-side video, when a front-side video and/or a rear-side video is already displayed, it is preferable that the selection button for selecting a front-side video and/or a rear-side video is not displayed. Thus, one or less front-side video and rear-side video can be displayed together with a spherical video.

When a new window as one of the various video areas 652 is added (S404: YES), the display control unit 16 sets a predetermined-area image Q of a predetermined area T in the spherical video corresponding to a position where the operator performs a long tap or a double tap to the new window as one of the various video areas 652, and displays the new window including the predetermined-area image Q as being superimposed on the spherical video (S405).

Patterns 1 to 3 are desired heretofore. The operator can switch the display from among Patterns 1 to 3 at will by a predetermined operation such as pressing a button.

<Switching Patterns>

The operator can switch Patterns 1 to 3 from one to another at will. In addition, if Patterns 1 to 3 are automatically switched from one to another in response to some event, the usability of the operator is improved.

Figure 28B:
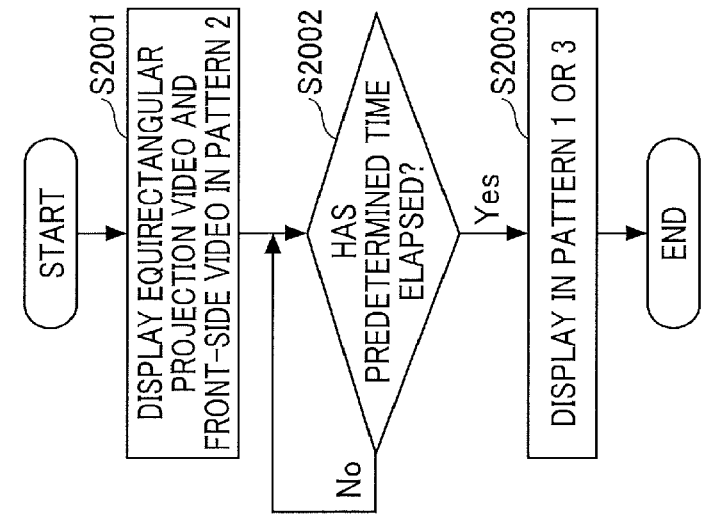
FIG. 28A and FIG. 28B are flowcharts for describing examples of triggers for automatically switching the patterns, according to an embodiment of the present disclosure.
Figure 28A:
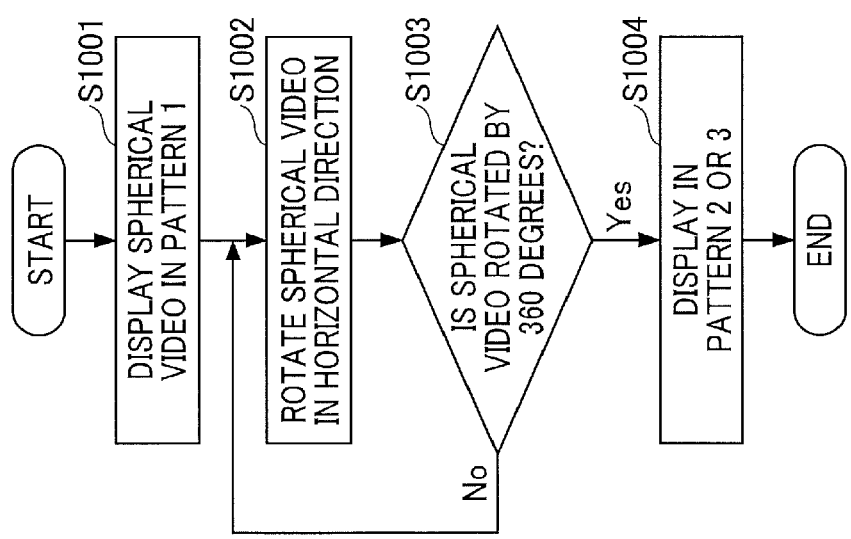

A description is now given of triggers for switching the pattern with reference to FIG. 28A and FIG. 28B. FIG. 28A and FIG. 28B are flowcharts for explaining examples of triggers for automatically switching the patterns.

A description is now given of an operation illustrated in the flowchart of FIG. 28A. The operation illustrated in the flowchart of FIG. 28A is started when the communication terminal 10A establishes a session.

In response to the establishment of a session, the display control unit 16 of the communication terminal 10A can display a spherical video, a front-side video, and a rear-side video. First, the display control unit 16 displays a spherical video in the video display area 611 in Pattern 1 (S1001). In other words, the spherical video is displayed on the entire are of the display 109.

Next, the display control unit 16 rotates the spherical video in the horizontal direction at a constant speed (S1002). The process of step S1002 is implement by changing the azimuth angle aa at a constant speed with the elevation angle ea constant in the horizontal direction while keeping the angle of view a constant. As a result, to the operator, the predetermined-area image Q appears to rotate.

The display control unit 16 determines whether the spherical video has been rotated by 360 degrees in the horizontal direction (S1003). This determination is made by storing the direction (ea, aa) of the center point CP before starting the rotation. The rotation continues until the spherical video rotates by 360 degrees in the horizontal direction.

When the display control unit 16 determines that the spherical video rotates by 360 degrees in the horizontal direction (S1003: YES), the display control unit 16 switches the current Pattern 1 to Pattern 2 or Pattern 3 (S1004).

Immediately after the session is established, the operator does not know the surrounding situation. With the processes as described with reference to FIG. 28A, the predetermined-area image Q is rotated by 360 degrees immediately after the session is established, and then videos or images are displayed in Patterns 2 or 3. This allows the operator to first recognize the situation, and then check the situation of the front by viewing a front-side video and start moving. Alternatively, the front-side video can be displayed large with the display pattern unchanged from Pattern 1.

A description is now given of an operation illustrated in the flowchart of FIG. 28B. The operation illustrated in the flowchart of FIG. 28A is started when the communication terminal 10A establishes a session.

In response to the establishment of a session, the display control unit 16 of the communication terminal 10A can display a spherical video, a front-side video, and a rear-side video. First, the display control unit 16 displays an equirectangular projection video and a front-side video in Pattern 2 (S2001). In other words, the equirectangular projection video is displayed small in the upper part of the display 109, and the front-side video is displayed in the lower part of the display 109.

The display control unit 16 determines whether a predetermined time period has elapsed since the videos are displayed in Pattern 2 (S2002). The display control unit 16 keeps displaying the videos in Pattern 2 until the predetermined time period passes.

When the display control unit 16 determines that the predetermined time period has elapsed (S2002: YES), the display control unit 16 switches the current Pattern 2 to Pattern 1 or Pattern 3 (S2003).

Immediately after the session is established, the operator does not know the surrounding situation. With the processes as described with reference to FIG. 28B, the equirectangular projection video is first displayed in Pattern 2 for a predetermined time period after the session is established, and then Pattern 2 is switched to Pattern 1 or Pattern 3. This allows the operator to first recognize the situation, and then check the situation of the front by viewing a front-side video and start moving. Alternatively, the display of Pattern 2 can be continued.

As described heretofore, the communication terminal 10A according to the present embodiment appropriately arranges and displays a spherical video and a front-side video (rear-side video). This allows the operator of the communication terminal 10A to check an overview situation around the mobile apparatus 20 or check the front-side video or the rear-side video having high resolution. Displaying the spherical video and the front-side video (rear-side video) in the layouts of Patterns 1 to 3 allows the operator to cause the mobile apparatus 20 to move by using the spherical video and the front-side video (rear-side video) or to check the surroundings. Also, Patterns 1 to 3 can be switched from one to another at the operator's will or automatically.

<Variation>

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, in the above description of the present embodiment, the wide-angle image capturing apparatus 9 transmits an equirectangular projection video to the communication terminal 10B, and the communication terminal 10B transmits the equirectangular projection video to the communication terminal 10A. Alternatively, the wide-angle image capturing apparatus 9 can directly establish a session with the communication terminal 10A to transmit an equirectangular projection video. In this case, the wide-angle image capturing apparatus 9 is one form of the communication terminal 10. In other words, the wide-angle image capturing apparatus 9 is the communication terminal 10 that transmits video but does not receive video.

Further, although in the above description of the present embodiment, the communication terminal 10B transmits a rear-side video, the communication terminal 10B may not transmit a rear-side video. In another example, the communication terminal 10B can transmit an image having a normal angle of view in addition to or in alternative to a front-side video and a rear-side video.

Further, Patterns 1 to 3 are not independent from one another, and one communication terminal 10 can change the display pattern such as from Pattern 1 to Pattern 2, from Pattern 2 to Pattern 3, and Pattern 3 to 1 (or with the order reversed).

Further, in the above description of the present embodiment, the mobile apparatus 20 is an apparatus that moves on land. In another example, the mobile apparatus 20 can be an apparatus that flies in the air such as a drone. In still another example, the mobile apparatus 20 can be an apparatus that travels on the sea or moves in the water. In still another example, the mobile apparatus 20 can be an apparatus that moves on an underground passageway, on a narrow road, or underground. In addition, when the mobile apparatus 20 is an apparatus that moves on land, the mobile apparatus 20 can move with wheels, with multiple legs such as two, three or four legs, or with Caterpillar (registered trademark).

Further, the display method of the present embodiment can be applied not only to a telepresence robot but images (video) captured by the wide-angle image capturing apparatus 9 mounted to an apparatus moved by a person and images (video) captured by a planar image capturing apparatus.

Further, although in the present embodiment, a description is given above of an example case in which one operator operates one mobile apparatus 20, one operator can operate a plurality of mobile apparatuses 20. In this case, the communication terminal 10A establishes a session with a plurality of communication terminals 10B. In another example, multiple operators can operate one mobile apparatus 20. In this case, for example, an operation instruction information transmitted to the communication terminal 10B last is a valid operation instruction information. Alternatively, the concept of an operation right can be introduced so that only the communication terminal 10A having the operation right can transmit an operation instruction. The operation right can be transferred by an operation by the operator, for example.

In the above description of the present embodiment, operation instruction information is transmitted in a communication session. Alternatively, operation instruction information can be transmitted in a session of content data.

Further, in the above description of the present embodiment, the communication terminals 10 communicates with each other via the relay apparatus 30. Alternatively, the communication terminals 10 can communicate with each other without intervention of the relay apparatus 30. In such communication, a communication protocol such as web real-time communication (WebRTC) is used.

In addition, in the example of a functional configuration as illustrated in FIG. 14A and FIG. 14B, processes performed by the communication management system 50 and the communication terminal 10 are divided based on main functions in order to facilitate understanding of processes. No limitation is intended by how the processes are divided or by the name of the processes. The processes implemented by communication management system 50 and the communication terminal 10 can be divided to a larger number of processes according to the contents of processes. Further, one process can be divided to include a larger number of processes.

In the present embodiment, a description is given of an example case in which the communication management system 50 and the relay apparatus 30 are independent apparatuses for the sake of explanatory convenience. In another example, an apparatus in which the functions of the communication management system 50 and the relay apparatus 30 can provide the functions of the communication management system 50 and the relay apparatus 30.

In still another example, the communication system 1 can include a plurality of communication management systems 50, and the functions of the communication management system 50 can be distributed over the plurality of servers.

In still another example, one or more of the databases that the communication management system 50 includes in the storage unit 5000 can be present on the communication network 2.

The data exchange unit 11 is an example of communication means. The display control unit 16 is an example of display processing means. The operation input receiving unit 12 is an example of receiving means.

In the related art, a controller for controlling a mobile apparatus is not considered. In other words, there is no disclosure on how to display the controller while displaying a plurality of videos transmitted from the mobile apparatus.

According to one or more embodiments of the present disclosure, a communication terminal is provided that can control a robot while an operator is looking at images that are captured by of a plurality of image capturing apparatuses and transmitted from a mobile apparatus.

According to one or more embodiments, a communication terminal is provided that displays images suitable for viewing to an operator, the images being captured by a plurality of image capturing apparatuses and transmitted from a mobile apparatus.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

What is claimed is:

1. A communication terminal, communicable with another communication terminal mounted on a telepresence robot or with a communication device of the telepresence robot via a network, for transmitting operation instruction information for controlling the telepresence robot to the another communication terminal or the communication device, the communication terminal comprising circuitry configured to:
receive a first video and a second video transmitted by the telepresence robot that captures the first video and the second video, wherein the first video, the first video being a planar image, is captured by a planar image capturing device included in the telepresence robot, and the second video, the second video being a wide-angle image captured by a wide-angle image capturing apparatus included in the telepresence robot;
display the first video and a spherical video generated from the second video, the first video and the second video being received, on a same screen of a display device by arranging the first video and the spherical video on the same screen of the display device, the spherical video having a wide-angle of view wider than an angle of view of the first video;
display, on the same screen of the display device, a controller for controlling a motion of the telepresence robot by a driver and a steering device included in the telepresence robot, while superimposing the controller on the at least one of the first video and the spherical video on the same screen; and transmit, to the telepresence robot, the operation instruction information for controlling the telepresence robot, wherein the circuitry is configured to generate the spherical video based on the second video transmitted from the telepresence robot, the spherical video being represented as a three-dimensional sphere in a virtual space, wherein, in response to an input from an operator operating the communication terminal to control displaying of the spherical video, the circuitry is configured to change an area of the spherical video displayed on the display device by changing a position of a virtual camera with respect to the spherical video represented as the three-dimensional sphere, the position of the virtual camera corresponding to a visual point of an operator operating the communication terminal, and wherein the telepresence robot includes the planar image capturing device, the wide-angle image capturing apparatus, a wheel, the driver that drives the wheel, and the steering device that changes a direction and an inclination of the wheel.

2. The communication terminal of claim 1, wherein the circuitry is further configured to display a display area of the first video on the same screen of the display device in a larger size compared to a display area of the spherical video the same screen.

3. The communication terminal of claim 1, wherein the circuitry is further configured to display a display area of the spherical video on the same screen of the display device in a larger size compared to a display area of the first video the same screen.

4. The communication terminal of claim 3, wherein the circuitry is further configured to receive the first video including one-side video viewed from one imaging direction and another-side video viewed from another imaging direction, different from the one imaging direction, the one-side video and the another-side video being transmitted by the another communication terminal or the communication device, and wherein the circuitry is further configured to display the one-side video, the another-side video, and the spherical video on the same screen of the display device.

5. The communication terminal of claim 3, wherein the circuitry is further configured to display the first video as being superimposed on the spherical video.

6. The communication terminal of claim 5, wherein the circuitry is further configured to:

generate a duplicate video obtained by generating a duplicate of a partial angle of view of the spherical video; and display the duplicate video as being superimposed on the spherical video.

7. The communication terminal of claim 6, wherein the circuitry is configured to:

receive an instruction for changing a position of the first video or the duplicate video in the spherical video; and display the first video or the duplicate video at a position indicated by the received instruction for changing the position.

8. The communication terminal of claim 7, wherein the circuitry is further configured to receive an instruction for deleting the duplicate video, an instruction for minimizing the duplicate video, or an instruction for generating a new duplicate video, wherein the circuitry hides the duplicate video when the circuitry receives the instruction for deleting the duplicate video, wherein the circuitry minimizes a display size of the duplicate video when the circuitry receives the instruction for minimizing the duplicate video, and wherein the circuitry displays the new duplicate video when the circuitry receives the instruction for generating the new duplicate video.

9. The communication terminal of claim 3, wherein the circuitry is further configured to display, on the display device, the controller by superimposing the controller on the display area of the first video, from among the first video and the spherical video displayed on the display device.

10. The communication terminal of claim 3, wherein the circuitry is further configured to display the spherical video in an upper area on the same screen of the display device, and to display the first video below the spherical video on the same screen of the display device.

11. The communication terminal of claim 3, wherein the circuitry is further configured to display a single item of the spherical video in an upper area on the same screen of the display device, and to display a single item of the first video below the single item of the spherical video on the same screen of the display device.

12. The communication terminal of claim 1, wherein the circuitry is further configured to display a display area of the spherical video and a display area of the first video in a same size on the same screen of the display device.

13. The communication terminal of claim 1, wherein the circuitry is further configured to display only one of the first video and the spherical video on the same screen of the display device according to a user operation.

14. The communication terminal of claim 1, wherein when the communication terminal starts communication with the another communication terminal or the communication device, the circuitry is further configured to rotate the spherical video and display the first video when the spherical video is rotated by a specific degree.

15. The communication terminal of claim 1, wherein the controller includes four buttons, and the four buttons correspond to buttons for controlling the telepresence robot to move back, forth, right, and left, respectively.

16. The communication terminal of claim 1, wherein the first video is a front-side video or a rear-side video of the telepresence robot or the another communication terminal, wherein the spherical video displayed on the same screen of the display device corresponds to a predetermined area of the wide-angle image.

17. The communication terminal of claim 1, wherein an image capturing device to capture the first video and the wide-angle image capturing apparatus to capture the second video are included in the single telepresence robot.

18. A non-transitory computer-readable medium storing a program for causing a communication terminal, communicable with another communication terminal mounted on a telepresence robot or with a communication device of the telepresence robot via a network, for transmitting operation instruction information for controlling the telepresence robot to the another communication terminal or the communication device to perform a method comprising:

receiving a first video and a second video transmitted by the telepresence robot that captures the first video and the second video, wherein the first video, the first video being a planar image, is captured by a planar image capturing device included in the telepresence robot, and the second video, the second video being a wide-angle image captured by a wide-angle image capturing apparatus included in the telepresence robot;

displaying the first video and a spherical video generated from the second video, the first video and the video being received, on a same screen of a display device by arranging the first video and the spherical video on the same screen of the display device, the spherical video having a wide-angle of view wider than an angle of view of the first video;

display, on the same screen of the display device, a controller for controlling a motion of the telepresence robot by a driver and a steering device included in the telepresence robot, while superimposing the controller on the at least one of the first video and the spherical video on the same screen; and transmitting, to the telepresence robot, the operation instruction information for controlling the telepresence robot, wherein the spherical video is generated based on the second video transmitted from the telepresence robot, the spherical video being represented as a three-dimensional sphere in a virtual space, wherein, in response to an input from an operator operating the communication terminal to control displaying of the spherical video, an area of the spherical video displayed on the display device is changed by changing a position of a virtual camera with respect to the spherical video represented as the three-dimensional sphere, the position of the virtual camera corresponding to a visual point of an operator operating the communication terminal, and wherein the telepresence robot includes the planar image capturing device, the wide-angle image capturing apparatus, a wheel, the driver that drives the wheel, and the steering device that changes a direction and an inclination of the wheel.

19. A display method performed by a communication terminal, communicable with another communication terminal mounted on a telepresence robot or with a communication device of the telepresence robot via a network, for transmitting operation instruction information for controlling the telepresence robot to the another communication terminal or the communication device, the method comprising:

receiving a first video and a second video transmitted by the telepresence robot that captures the first video and the second video, wherein the first video, the first video being a planar image, is captured by a planar image capturing device included in the telepresence robot, and the second video, the second video being a wide-angle image captured by a wide-angle image capturing apparatus included in the telepresence robot;

displaying the first video and a spherical video generated from the second video, the first video and the second video being received, on a same screen of a display device by arranging the first video and the spherical video on the same screen of the display device, the spherical video having a wide-angle of view wider than an angle of view of the first video;

displaying, on the same screen of the display device, a controller for controlling a motion of the telepresence robot by a driver and a steering device included in the telepresence robot, while superimposing the controller on the at least one of the first video and the spherical video on the same screen; and transmitting, to the telepresence robot, the operation instruction information for controlling the telepresence robot, wherein the spherical video is generated based on the second video transmitted from the telepresence robot, the spherical video being represented as a three-dimensional sphere in a virtual space, wherein, in response to an input from an operator operating the communication terminal to control displaying of the spherical video, an area of the spherical video displayed on the display device is changed by changing a position of a virtual camera with respect to the spherical video represented as the three-dimensional sphere, the position of the virtual camera corresponding to a visual point of an operator operating the communication terminal, and wherein the telepresence robot includes the planar image capturing device, the wide-angle image capturing apparatus, a wheel, the driver that drives the wheel, and the steering device that changes a direction and an inclination of the wheel.

* * * * *